United States Patent
Tawney et al.

(10) Patent No.: US 7,244,483 B2
(45) Date of Patent: Jul. 17, 2007

(54) BLADDER WITH INVERTED EDGE SEAM AND METHOD OF MAKING THE BLADDER

(75) Inventors: John C. Tawney, Portland, OR (US); David B. Herridge, Mendota Heights, MN (US)

(73) Assignee: Nike, Inc., Beaverton, OR (US)

( * ) Notice: Subject to any disclaimer, the term of this patent is extended or adjusted under 35 U.S.C. 154(b) by 956 days.

(21) Appl. No.: 10/159,615

(22) Filed: May 29, 2002

(65) Prior Publication Data

US 2002/0139471 A1    Oct. 3, 2002

Related U.S. Application Data

(62) Division of application No. 09/526,863, filed on Mar. 16, 2000, now Pat. No. 6,402,879.

(51) Int. Cl.
B29D 22/00    (2006.01)
B29D 23/00    (2006.01)
B32B 1/08     (2006.01)

(52) U.S. Cl. .......................... 428/35.7; 428/69; 36/28; 36/29; 36/30 R; 36/34 R; 36/35 R; 36/37; 36/35 B; 5/706; 5/709; 5/710; 5/713; 5/654

(58) Field of Classification Search ............... 428/69, 428/35.7; 36/28, 29, 30 R, 31, 34 R, 35 R, 36/37, 35 B; 5/706, 709, 710, 713, 654
See application file for complete search history.

(56) References Cited

U.S. PATENT DOCUMENTS 900,867 A    10/1908 Miller

| 1,069,001 A | 7/1913 | Guy |
| 1,240,153 A | 9/1917 | Olsen |
| 1,304,915 A | 5/1919 | Spinney |
| 1,323,610 A | 12/1919 | Price |
| 1,514,468 A | 11/1924 | Schopf |
| 1,584,034 A | 5/1926 | Klotz |

(Continued)

FOREIGN PATENT DOCUMENTS

AT    181938    2/1906

(Continued)

OTHER PUBLICATIONS

Sports Research Review, NIKE, Inc., Jan./Feb. 1990.

(Continued)

*Primary Examiner*—Michael C. Miggins
(74) *Attorney, Agent, or Firm*—Plumsea Law group, LLC

(57) ABSTRACT

The invention is a bladder formed of multiple layers of barrier film to provide multiple pressurized layers of cushioning fluid or gas when the bladder is filled. The sidewalls of the bladder can be constructed with an inverted seam construction to eliminate finishing steps in the manufacture of cushioning bladders and alternatively to provide a clean, seamless appearance along the side walls. The inverted seam can be formed by attaching the peripheral edges of inner barrier layers to the outer barrier layers adjacent a weld between inner barrier layers to provide an inside-out inverted seam appearance. An inverted seam can also be formed by providing separate sidewall elements attached to the barrier layers of the bladder to provide a seam displaced from the center of the sidewall.

20 Claims, 20 Drawing Sheets

U.S. PATENT DOCUMENTS

| | | |
|---|---|---|
| 1,625,582 A | 4/1927 | Anderson |
| 1,625,810 A | 4/1927 | Krichbaum |
| 1,869,257 A | 7/1932 | Hitzler |
| 1,916,483 A | 7/1933 | Krichbaum |
| 1,970,803 A | 8/1934 | Johnson |
| 2,004,906 A | 6/1935 | Simister |
| 2,080,469 A | 5/1937 | Gilbert |
| 2,086,389 A | 7/1937 | Pearson |
| 2,269,342 A | 1/1942 | Johnson |
| 2,365,807 A | 12/1944 | Dialynas |
| 2,488,382 A | 11/1949 | Davis |
| 2,546,827 A | 3/1951 | Lavinthal |
| 2,600,239 A | 6/1952 | Gilbert |
| 2,645,865 A | 7/1953 | Town |
| 2,677,906 A | 5/1954 | Reed |
| 2,703,770 A | 3/1955 | Melzer |
| 2,748,401 A | 6/1956 | Winstead |
| 3,030,640 A | 4/1962 | Gosman |
| 3,048,514 A | 8/1962 | Bentele et al. |
| 3,120,712 A | 2/1964 | Menken |
| 3,121,430 A | 2/1964 | O'Reilly |
| 3,204,678 A | 9/1965 | Worcester |
| 3,251,076 A | 5/1966 | Burke |
| 3,284,264 A | 11/1966 | O'Rourke |
| 3,335,045 A | 8/1967 | Post |
| 3,366,525 A | 1/1968 | Jackson |
| 3,469,576 A | 9/1969 | Smith et al. |
| 3,568,227 A | 3/1971 | Dunham |
| 3,589,037 A | 6/1971 | Gallagher |
| 3,608,215 A | 9/1971 | Fukuoka |
| 3,685,176 A | 8/1972 | Rudy |
| 3,758,964 A | 9/1973 | Nishimura |
| 3,765,422 A | 10/1973 | Smith |
| 4,017,931 A | 4/1977 | Golden |
| 4,054,960 A | 10/1977 | Pettit et al. |
| 4,115,934 A | 9/1978 | Hall |
| 4,129,951 A | 12/1978 | Petrosky |
| 4,167,795 A | 9/1979 | Lambert, Jr. |
| 4,183,156 A | 1/1980 | Rudy |
| 4,187,620 A | 2/1980 | Seiner |
| 4,217,705 A | 8/1980 | Donzis |
| 4,219,945 A | 9/1980 | Rudy |
| 4,271,606 A | 6/1981 | Rudy |
| 4,287,250 A | 9/1981 | Rudy |
| 4,292,702 A | 10/1981 | Phillips |
| 4,297,797 A | 11/1981 | Meyers |
| 4,305,212 A | 12/1981 | Coomer |
| 4,328,599 A | 5/1982 | Mollura |
| 4,358,902 A | 11/1982 | Cole et al. |
| 4,431,003 A | 2/1984 | Sztancsik |
| 4,446,634 A | 5/1984 | Johnson et al. |
| 4,483,030 A | 11/1984 | Plick et al. |
| 4,486,964 A | 12/1984 | Rudy |
| 4,506,460 A | 3/1985 | Rudy |
| 4,547,919 A | 10/1985 | Wang |
| 4,662,087 A | 5/1987 | Beuch |
| 4,670,995 A | 6/1987 | Huang |
| 4,686,130 A | 8/1987 | Kon |
| 4,722,131 A | 2/1988 | Huang |
| 4,744,157 A | 5/1988 | Dubner |
| 4,779,359 A | 10/1988 | Famolare, Jr. |
| 4,782,602 A | 11/1988 | Lakic |
| 4,803,029 A | 2/1989 | Iversen et al. |
| 4,817,304 A | 4/1989 | Parker et al. |
| 4,823,482 A | 4/1989 | Lakic |
| 4,845,338 A | 7/1989 | Lakic |
| 4,845,861 A | 7/1989 | Moumgdgian |
| 4,874,640 A | 10/1989 | Donzis |
| 4,891,855 A | 1/1990 | Cheng-Chung |
| 4,906,502 A | 3/1990 | Rudy |
| 4,912,861 A | 4/1990 | Huang |
| 4,936,029 A | 6/1990 | Rudy |
| 4,965,899 A | 10/1990 | Sekido et al. |
| 4,991,317 A | 2/1991 | Lakic |
| 4,999,931 A | 3/1991 | Vermeulen |
| 4,999,932 A | 3/1991 | Grim |
| 5,022,109 A | 6/1991 | Pekar |
| 5,025,575 A | 6/1991 | Lakic |
| 5,042,176 A | 8/1991 | Rudy |
| 5,044,030 A | 9/1991 | Balaton |
| 5,046,267 A | 9/1991 | Kilgore et al. |
| 5,083,361 A | 1/1992 | Rudy |
| 5,104,477 A | 4/1992 | Williams et al. |
| 5,155,927 A | 10/1992 | Bates et al. |
| 5,158,767 A | 10/1992 | Cohen et al. |
| 5,179,792 A | 1/1993 | Brantingham |
| 5,193,246 A | 3/1993 | Huang |
| 5,199,191 A | 4/1993 | Moumdjian |
| 5,224,277 A | 7/1993 | Sang Do |
| 5,224,278 A | 7/1993 | Jeon |
| 5,228,156 A | 7/1993 | Wang |
| 5,235,715 A | 8/1993 | Donzis |
| 5,238,231 A | 8/1993 | Huang |
| 5,245,766 A | 9/1993 | Warren |
| 5,253,435 A | 10/1993 | Auger et al. |
| 5,257,470 A | 11/1993 | Auger et al. |
| 5,297,349 A | 3/1994 | Kilgore |
| 5,335,382 A | 8/1994 | Huang |
| 5,337,492 A | 8/1994 | Anderie et al. |
| 5,353,523 A | 10/1994 | Kilgore et al. |
| 5,355,552 A | 10/1994 | Huang |
| 5,367,791 A | 11/1994 | Gross et al. |
| 5,406,719 A | 4/1995 | Potter |
| 5,425,184 A | 6/1995 | Lyden et al. |
| 5,543,194 A | 8/1996 | Rudy |
| 5,558,395 A | 9/1996 | Huang |
| 5,572,804 A | 11/1996 | Skaja et al. |
| 5,595,004 A | 1/1997 | Lyden et al. |
| 5,625,964 A | 5/1997 | Lyden et al. |
| 5,669,161 A | 9/1997 | Huang |
| 5,686,167 A | 11/1997 | Rudy |
| 5,713,141 A | 2/1998 | Mitchell et al. |
| 5,741,568 A | 4/1998 | Rudy |
| 5,753,061 A | 5/1998 | Rudy |
| 5,755,001 A | 5/1998 | Potter et al. |
| 5,771,606 A | 6/1998 | Litchfield et al. |
| 5,802,739 A | 9/1998 | Potter et al. |
| 5,830,553 A | 11/1998 | Huang |
| 5,832,630 A | 11/1998 | Potter |
| 5,846,063 A | 12/1998 | Lakic |
| 5,902,660 A | 5/1999 | Huang |
| 5,907,911 A | 6/1999 | Huang |
| 5,916,664 A | 6/1999 | Rudy |
| 5,925,306 A | 7/1999 | Huang |
| 5,937,462 A | 8/1999 | Huang |
| 5,952,065 A | 9/1999 | Mitchell et al. |
| 5,974,608 A * | 11/1999 | Haller et al. ................... 5/709 |
| 5,976,451 A | 11/1999 | Skaja et al. |
| 5,979,078 A | 11/1999 | McLaughlin |
| 5,987,780 A | 11/1999 | Lyden et al. |
| 5,993,585 A | 11/1999 | Goodwin et al. |
| 6,013,340 A | 1/2000 | Bonk et al. |
| 6,027,683 A | 2/2000 | Huang |
| 6,029,962 A | 2/2000 | Shorten et al. |
| 6,055,746 A | 5/2000 | Lyden et al. |
| 6,065,150 A | 5/2000 | Huang |
| 6,098,313 A | 8/2000 | Skaja |
| 6,119,371 A | 9/2000 | Goodwin et al. |
| 6,127,010 A | 10/2000 | Rudy |
| 6,128,837 A | 10/2000 | Huang |

| | | | |
|---|---|---|---|
| 6,176,025 B1 | 1/2001 | Patterson et al. | |

FOREIGN PATENT DOCUMENTS

| | | |
|---|---|---|
| AT | 200963 | 12/1958 |
| CA | 727582 | 2/1966 |
| DE | 32 34 086 | 9/1982 |
| DE | G92 01 758.4 | 12/1992 |
| EP | 0 094 868 | 5/1983 |
| EP | 0 215 974 A1 | 9/1985 |
| EP | 0 605 485 B1 | 9/1992 |
| EP | 0 780 064 A2 | 6/1997 |
| FR | 1195549 | 11/1959 |
| FR | 1406610 | 11/1965 |
| FR | 2144464 | 1/1973 |
| FR | 2404413 | 4/1979 |
| FR | 2407008 | 5/1979 |
| FR | 2483321 | 4/1981 |
| FR | 2614510 | 4/1987 |
| FR | 2639537 | 11/1988 |
| GB | 7441 | 0/1906 |
| GB | 14955 | 0/1893 |
| GB | 233387 | 1/1924 |
| GB | 978654 | 12/1964 |
| GB | 1128764 | 10/1968 |
| JP | 4-266718 | * 9/1992 |
| JP | 266718 | 9/1992 |
| JP | 6-181802 | 7/1994 |
| TW | 75100322 | 1/1975 |
| TW | 54221 | 6/1978 |
| WO | WO89/10074 | 11/1989 |
| WO | WO90/10396 | 9/1990 |
| WO | WO91/11928 | 8/1991 |
| WO | WO91/11931 | 8/1991 |
| WO | WO92/08384 | 5/1992 |
| WO | WO95/20332 | 8/1995 |
| WO | WO95/09546 | 3/1998 |

OTHER PUBLICATIONS

Brooks Running Catalog, Fall 1991.

* cited by examiner

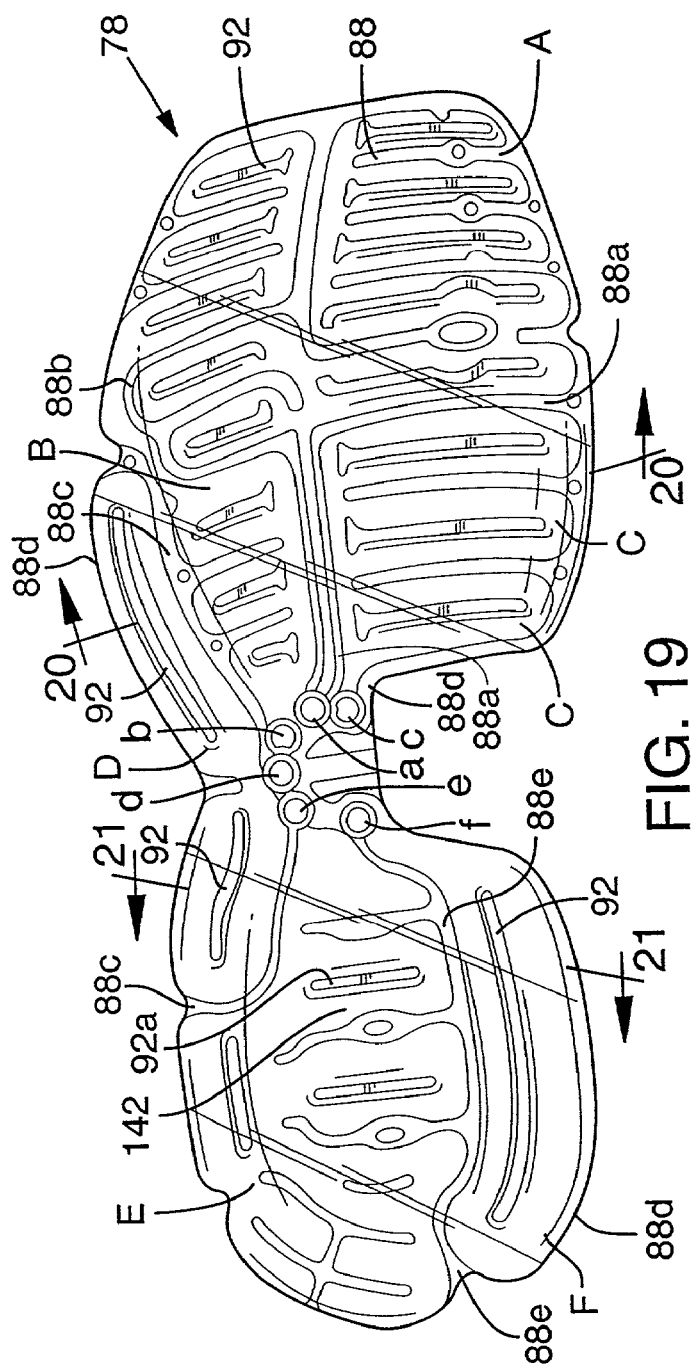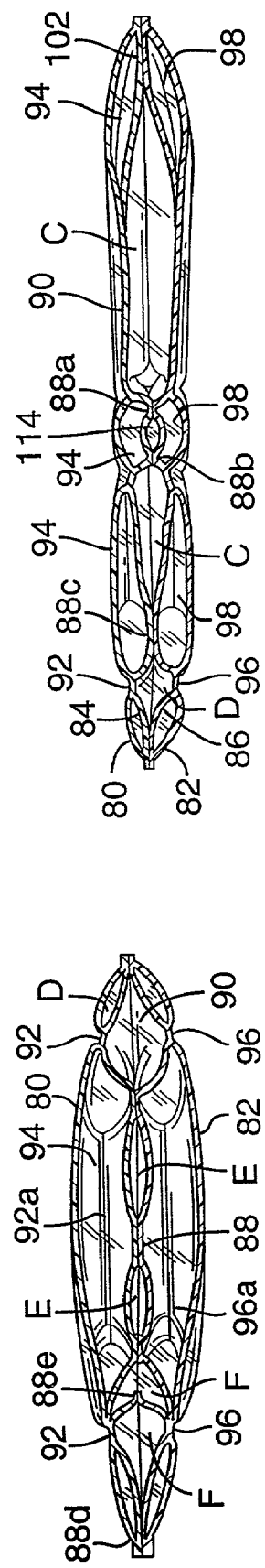
FIG. 19
FIG. 20
FIG. 21

BLADDER WITH INVERTED EDGE SEAM AND METHOD OF MAKING THE BLADDER

This is a divisional application that claims priority under 35 U.S.C. §120 to U.S. patent application Ser. No. 09/526,863, filed Mar. 16, 2000 now U.S. Pat. No. 6,402,879.

FIELD OF THE INVENTION

The present invention relates to an improved cushioning member for a shoe, and more particularly to a fluid filled bladder having multiple layers of chambers with an inverted edge seam and a method of forming an improved cushioning member with inverted seam lines along its sidewalls.

BACKGROUND OF THE INVENTION

Considerable work has been done to improve the construction of cushioning members which utilize fluid filled bladders such as those used in shoe soles. Although with recent developments in materials and manufacturing methods, fluid filled bladders have greatly improved in versatility, there remain problems associated with obtaining optimum cushioning performance and durability. Fluid filled bladder members are commonly referred to as "air bladders," and the fluid is generally a gas which is commonly referred to as "air" without intending any limitation as to the actual gas composition used.

There are numerous conventional articles of footwear having gas filled cushioning devices in their midsole or outsole. Gas filled cushioning devices are typically referred to as bladders or "air bladders," and the gas is commonly referred to as "air" without intending any limitation as to the actual gas composition used. One well known type of bladder used in footwear is commonly referred to as a "two film bladder." These bladders include an outer shell formed by welding the peripheral edges of two symmetric pieces of a barrier material together. This results in the top, bottom and sidewalls of the bladder being formed of the same barrier material. If any one part of a two film bladder needs to be formed of a specific material and/or to a specific thickness, the entire bladder must be formed of that specific material and/or to that specific thickness. Forming a bladder from only two pieces of a barrier material prevents the side, top and bottom walls from being customized.

Closed-celled foam is often used as a cushioning material in shoe soles and ethylene-vinyl acetate copolymer (EVA) foam is a common material. In many athletic shoes, the entire midsole is comprised of EVA. While EVA foam can easily be cut into desired shapes and contours, its cushioning characteristics are limited. One of the advantages of gas filled bladders is that gas as a cushioning compound is generally more energy efficient than closed-cell foam. This means that a shoe sole comprising a gas filled bladder provides superior cushioning response to loads than a shoe sole comprising only foam. Cushioning generally is improved when the cushioning component, for a given impact force, spreads the impact force over a longer period of time, resulting in a smaller impact force being transmitted to the wearer's body. Even shoe soles comprising gas filled bladders include some foam, and a reduction in the amount of foam will generally afford better cushioning characteristics.

The major engineering problems associated with the design of air bladders formed of barrier layers include: (I) obtaining complex-curved, contoured shapes without the formation of deep peaks and valleys in the cross section which require filling in or moderating with foams or plates; (ii) ensuring that the means employed to give the air bladder its complex-curved, contoured shape does not significantly compromise the cushioning benefits of air; (iii) providing regionalized cushioning to an air bladder to account for differences in load corresponding to the anatomical topology of a human foot especially during high loads; (iv) designing air bladders which maximize the cushioning properties of air and are made entirely of flat barrier films; and (v) designing bladders that provide the advantages of complex-contoured shapes and regionalized cushioning and which can be integrated easily into existing midsole manufacturing methods.

The prior art is replete with attempts to address these difficulties, but have only solved one, two or even three of the above-described problems often presenting new obstacles in the process. Most of the prior art discloses some type of tensile member. A tensile member is an element associated with a bladder which ensures a fixed, resting relation between the top and bottom barrier layers when the bladder is fully filled, and which often is in a state of tension while acting as a restraining means to maintain the general external form of the bladder.

Some prior art constructions are composite structures of bladders containing foam or fabric tensile members. One type of such composite construction prior art concerns bladders employing an open-celled foam core as disclosed in U.S. Pat. Nos. 4,874,640 and 5,235,715 to Donzis. These cushioning elements do provide latitude in their design in that the open-celled foam cores allow for complex-curved and contoured shapes of the bladder without deep peaks and valleys. However, bladders with foam core tensile member have the disadvantage of unreliable bonding of the core to the barrier layers. Another disadvantage of foam core bladders is that the foam core gives the bladder its shape and thus must necessarily function as a cushioning member which detracts from the superior cushioning properties of a gas alone. One reason for this is that in order to withstand the high inflation pressures associated with bladders, the foam core must be of a high strength which requires the use of a higher density foam. The higher the density of the foam, the less the amount of available volume in the bladder for a gas. Consequently, the reduction in the amount of gas in the bladder decreases the effectiveness of gas cushioning.

Even if a lower density foam is used, a significant amount of available volume is sacrificed which means that the deflection height of the bladder is reduced due to the presence of the foam, thus accelerating the effect of "bottoming out." Bottoming out refers to the premature failure of a cushioning device to adequately decelerate an impact load. Most cushioning devices used in footwear are non-linear compression based systems, increasing in stiffness as they are loaded. Bottoming out is the point where the cushioning system is unable to compress any further and is a common failure in shoe soles comprised of foam. Also, the elastic foam material itself performs a significant portion of the cushioning function and is subject to compression set. Compression set refers to the permanent compression of foam after repeated loads which greatly diminishes its cushioning aspects. In foam core bladders, compression set occurs due to the internal breakdown of cell walls under heavy cyclic compression loads such as walking or running. The walls of individual cells constituting the foam structure abrade and tear as they move against one another and fail. The breakdown of the foam exposes the wearer to greater shock forces.

Another type of composite construction prior art concerns air bladders which employ three dimensional fabric as tensile members such as those disclosed in U.S. Pat. Nos. 4,906,502 and 5,083,361 to Rudy, which are hereby incorporated by reference. The bladders described in the Rudy patents have enjoyed considerable commercial success in NIKE, Inc. brand footwear under the name Tensile-Air® and Zoom™. Bladders using fabric tensile members virtually eliminate deep peaks and valleys, and the methods described in the Rudy patents have proven to provide an excellent bond between the tensile fibers and barrier layers. In addition, the individual tensile fibers are small and deflect easily under load so that the fabric does not interfere with the cushioning properties of air.

One shortcoming of these bladders is that currently there is no known manufacturing method for making complex-curved, contoured shaped bladders using these fabric fiber tensile members. The bladders may be of different heights, but the top and bottom surfaces remain flat with no contours and curves.

Another disadvantage of fabric tensile members is the possibility of bottoming out. Although the fabric fibers easily deflect under load and are individually quite small, the sheer number of them necessary to maintain the shape of the bladder means that under high loads, a significant amount of the total deflection capability of the air bladder is reduced by the volume of fibers inside the bladder and the bladder can bottom out.

One of the primary problems experienced with the fabric fibers is that these bladders are initially stiffer during initial loading than conventional gas filled bladders. This results in a firmer feel at low impact loads and a stiffer "point of purchase" feel than belies their actual cushioning ability. This is because the fabric fibers have relatively low elongation to properly hold the shape of the bladder in tension, so that the cumulative effect of thousands of these relatively inelastic fibers is a stiff one. The tension of the outer surface caused by the low elongation or inelastic properties of the tensile member results in initial greater stiffness in the air bladder until the tension in the fibers is broken and the solitary effect of the gas in the bladder can come into play which can affect the point of purchase feel of footwear incorporating a fabric core bladder.

Another category of prior art concerns air bladders which are injection molded, blow-molded or vacuum-molded such as those disclosed in U.S. Pat. No. 4,670,995 to Huang and U.S. Pat. No. 4,845,861 to Moumdjian, which are hereby incorporated by reference. These manufacturing techniques can produce bladders of any desired contour and shape while reducing deep peaks and valleys.

In Huang '995 it is taught to form strong vertical columns so that they form a substantially rectilinear cavity in cross section. This is intended to give substantial vertical support to the cushion so that the cushion can substantially support the weight of the wearer with no inflation. Huang '995 also teaches the formation of circular columns using blow-molding. In this prior art method, two symmetrical rod-like protrusions of the same width, shape and length extend from the two opposite mold halves meet in the middle and thus form a thin web in the center of a circular column. These columns are formed of a wall thickness and dimension sufficient to substantially support the weight of a wearer in the uninflated condition. Further, no means are provided to cause the columns to flex in a predetermined fashion which would reduce fatigue failures. Huang's columns are also prone to fatigue failure due to compression loads which force the columns to buckle and fold unpredictably. Under cyclic compression loads, the buckling can lead to fatigue failure of the columns.

Yet another prior art category concerns bladders using a corrugated middle film as an internal member as disclosed in U.S. Pat. No. 2,677,906 to Reed which describes an insole of top and bottom sheets connected by lateral connections lines to a corrugated third sheet placed between them. The top and bottom sheets are heat sealed around the perimeter and the middle third sheet is connected to the top and bottom sheets by lateral connection lines which extend across the width of the insole. An insole with a sloping shape is thus produced, however, because only a single middle sheet is used, the contours obtained must be uniform across the width of the insole. By use of the attachment lines, only the height of the insole from front to back may be controlled and no complex-curved, contoured shapes are possible. Another disadvantage of Reed is that because the third, middle sheet is attached with connection lines that extend across the entire width of the insole, all the chambers formed are independent of one another and must be inflated individually which is impractical for mass production.

The alternative embodiment disclosed in the Reed patent uses just two sheets with the top sheet folded upon itself and attached to the bottom sheet at selected locations to provide rib portions and parallel pockets. The main disadvantage of this construction is that the ribs are vertically oriented and similar to the columns described in the patents to Huang and Moumdjian, would resist compression and interfere with and decrease the cushioning benefits of air. As with the first embodiment of Reed, each parallel pocket thus formed must be separately inflated.

A prior bladder and method of construction using flat films is disclosed in U.S. Pat. No. 5,755,001 to Potter et al, which is hereby incorporated by reference. The interior film layers are bonded to the envelope film layers of the bladder which defines a single pressure chamber. The interior film layers act as tensile members which are biased to compress upon loading. The biased construction reduces fatigue failures and resistance to compression. The bladder comprises a single chamber inflated to a single pressure with the tensile member interposed to give the bladder a complex-contoured profile. There is, however, no provision for multiple layers of fluid in the bladder which could be inflated to different pressures providing improved cushioning characteristics and point of purchase feel.

Another well known type of bladder is formed using blow molding techniques such as those discussed in U.S. Pat. No. 5,353,459 to Potter et al, which is hereby incorporated by reference. These bladders are formed by placing a liquefied elastomeric material in a mold having the desired overall shape and configuration of the bladder. The mold has an opening at one location through which pressurized gas is introduced. The pressurized gas forces the liquefied elastomeric material against the inner surfaces of the mold and causes the material to harden in the mold to form a bladder having the preferred shape and configuration. The produced bladders typically include a formed seam that is a result of the elastomeric material being forced between the mold halves when the halves are secured together. The seam appears in the center of the sidewalls and is directed outwardly away from the center of the bladder. The seam includes jagged edges and is visible when the bladder is exposed along the midsole of an article of footwear.

Many articles of footwear include at least one opening along their midsole for exposing the sidewalls of a contained bladder. When the exposed sidewalls are transparent, the interior of the bladder is visible. These openings along the midsole are commonly referred to as "windows" and are usually located in the heel and/or forefoot. Examples of such footwear include the NIKE AIRMAX shown in the 1995 and 1997 NIKE Footwear catalogs.

Because the exposed transparent material is vulnerable to being punctured, it must be of a strength and thickness that will resist penetration from external elements. As a result, the requirements of the material used for the exposed sidewalls control the construction, aesthetic and functional characteristics of the entire two film or blow molded bladder. Individual bladder components cannot be customized. Instead, the bladder is formed entirely of the transparent material having the thickness needed to prevent rupturing of the exposed sidewall. This results in the top and bottom of the bladder being formed of the same thick, transparent sidewall material, even if the transparent, puncture resistant material is not needed in these parts of the bladder. Unnecessarily thick top and bottom layers can detract from the overall flexibility of the bladder. Conversely, if certain portions of the bladder, such as the top and bottom surfaces, needed to be made of a thicker material relative to the transparent sidewalls, the transparency and/or flexibility of the sidewalls may be compromised. Using one material for each half of the bladder also prevents the bladder from being customized so different portions of the bladder offer different performance and aesthetic advantages.

Preparing a bladder for being exposed along the length of a sole window can also include expensive and time consuming manufacturing steps. As discussed, a construction seam can result along the sidewalls of a bladder during manufacturing. The seam appears in the center of the sidewall after the bladder has been inflated. The seam includes a thick, rough edge that during the manufacturing of the bladder must be reduced to prevent injury and give the sidewalls a smooth, uninterrupted look. The manufacturing steps taken to reduce the seam line increase the manufacturing time and cost of producing a bladder.

Cushioning system design must meet criteria for both comfort at low loads such as standing, walking, point of purchase feel, and performance at high loads such as running, planting, jumping, pivoting. In analyzing the cushioning characteristics of various devices, it is instructive to view such devices in cross-section. That is, take a visual slice vertically down into the midsole to reveal the cushioning profile of the structure that is to provide the necessary shock absorption and response functions. In prior art cushioning devices, typically any single cross section of the cushioning profile is generally a simple foam core, or a single layer of fluid sometimes surrounded by or encased in foam. This simple profile seeks to balance the low-load-high-load criteria by a compromise to both since a simple cushioning profile provides generally uniform shock absorption and response characteristics along the entire device, but does not provide a complex cushioning profile which can be customized or regionalized to the loads realized at certain points along a bladder.

A problem with manufacturing complex, highly regionalized bladders of two films has been inordinate twisting of the fluid filled part. A non-planar geometry is difficult to integrate into subsequent shoe making processes.

There exists a need for a bladder member which solves all of the problems listed above: complex-curved, contoured shapes; no interference with the cushioning benefits of gas alone; provision of regionalized cushioning that can be coupled to the anatomical features of a foot; and simplified manufacture through the use of flat barrier films and integration into existing midsole construction methods. As discussed above, while the prior art has addressed some of these problems, they each have their disadvantages and fall short of a complete solution.

One object of this invention is to provide a cushioning bladder for footwear with multiple stage cushioning regionalized characteristics constructed of film layers.

Another object of this invention is to provide a bladder for cushioning an article of footwear that can have different materials for its top outer barrier sheet, bottom outer barrier sheet and sidewalls.

A further object of this invention is to provide a method of forming a bladder with inverted seam lines that do not require special treatment during manufacturing.

SUMMARY OF THE INVENTION

The present invention pertains to a cushioning bladder and method of making the same. The bladder of the present invention may be incorporated into a sole assembly of a shoe to provide cushioning when filled with fluid. The bladder and method of the present invention allows for complex-curved, contoured shapes without interfering with the cushioning properties of gas, and provides regionalized cushioning profiles. A complex-contoured shape refers to varying the surface contour of the bladder in more than one direction. The present invention overcomes the enumerated problems with the prior art while avoiding the design trade-offs associated with the prior art attempts.

In accordance with one aspect of the present invention, a bladder is formed of multiple layers of barrier film to provide multiple pressurized layers of cushioning fluid or gas when the bladder is filled to provide layers of distinct cushioning properties. In a preferred embodiment, the distinct properties are caused by multiple pressurized layers of gas, wherein a multiple gas layer bladder enhances cushioning response by relying more on the response characteristics of the gas and reducing the amount of foam and the dependence on foam as a cushioning material.

The most basic construction is a bladder formed of three barrier layers which forms two pressurized layers of gas. A three layer bladder comprises two outer layers sealed around a perimeter to form the envelope of the bladder and a middle layer which is attached to the outer layers and serves as a tensile element. The location of the connection sites of the middle layer to the outer layers determines the topography of the outer surface of the bladder. A middle layer also divides the interior of the bladder into at least two layers of fluid or gas. Additional layers of film between the outer envelope layers provide more layers of fluid or pressurized gas with the interior layers of film being attached to one another in ways to allow for further customization of the cushioning profile.

A method of forming a cushioning bladder of the present invention comprises the steps of providing four vertically aligned sheets of barrier film, each of the sheets having a peripheral edge. A positioning step of the method includes placing the two inner sheets between the two outer sheets so that each inner sheet is adjacent an outer sheet. The inner sheets are positioned such that at least a portion of each of the sheets extends within the peripheral edge of the outer sheets. The method further includes the steps of securing the top outer and top inner sheets together proximate the peripheral edge of the top outer sheet, securing the bottom outer and bottom inner sheets together proximate the peripheral edge of the bottom outer sheet, and securing two inner sheets together at a location spaced inwardly from their peripheral edges and the peripheral edges of two outer sheets such that an inverted seam is formed in between the two outer sheets when fluid is introduced within the bladder. The sheets are secured relative to each other by directly connecting the sheets to one another or by securing them to respective ends of an intermediate member. The bottom inner and outer sheets can also be sized so that the resulting inverted seam is offset from the center of the resulting sidewall of the bladder.

The inverted seam bladders can include separate top, bottom and sidewall pieces of barrier materials that are individually selected to provide increased durability, greater puncture resistance and localized stiffness, where needed, for enhanced cushioning, stability and longevity. The individual pieces of barrier material that form the sidewalls can be varied depending upon the needs of each portion of the sidewall. The bladder according to the present invention comprises a top sheet of a barrier material having a peripheral edge and, a bottom sheet of a barrier material being at least partially coextensive with the top sheet. The bladder also includes first and second sidewall elements comprised of the same or different barrier materials. The first sidewall element extends between the top and bottom sheets, and itself has top and bottom edges. The top edge of the first sidewall element is secured to the top sheet of barrier material proximate its peripheral edge, and bottom edge of the first sidewall element is secured to the second sidewall element. The opposite edge of the second sidewall element is secured to the bottom sheet of barrier material so that a fluid containing bladder is formed with two sidewall elements extending between the top and bottom sheets.

During the production of the bladder, the inverted seams are formed by arranging the barrier sheets and sidewalls pieces so they are at least partially coextensive and welding the two sidewall pieces of barrier material together at a location spaced inwardly from the peripheral welds that secure the two sidewall pieces to the top and bottom barrier sheets, respectively. After the sheets and sidewalls have been secured to each other so that a sealed inner chamber is formed, a cushioning fluid is introduced into the bladder. When more than four sheets of barrier material are used in forming a bladder, each inverted seam is formed by securing adjacent sidewall pieces of barrier material together at locations spaced inwardly from the welds that secure the sidewalls to the top and bottom barrier sheets. The inverted construction seams according to the present invention do not need to be treated with any finishing steps in order to improve their appearance or eliminate thick, rough edge. As a result, the costly production steps associated with finishing and reducing conventional construction seams are eliminated.

The present invention makes it possible for a manufacturer to aesthetically customize a bladder. The manufacturer can use different barrier materials for the top barrier sheet, bottom barrier sheet and portions of the sidewalls of the bladder. This allows the different parts of the bladder to be customized so the top and bottom sheets are not formed of the transparent sidewall material. The bladder can also be customized so the upper and lower pieces of a sidewall do not have to be formed of the same material. Materials can be used for the sidewalls that have a greater strength or thickness when compared to those used for the top and bottom pieces, or vice versa. Also, the materials used for the top and bottom sheets may not have to be as stiff or resistant to lateral stresses as are those used for the sidewalls.

The present invention also permits a manufacturer to customize a bladder so it has certain performance characteristics in selected areas without furnishing the entire bladder with these characteristics or the materials that provide them. For example, the sidewalls of a bladder according to the present invention can be customized by using a material with the same degree of vertical stiffness, resistance to vertical compression, as the pressurized chambers they define. These sidewalls complement the cushioning and stability of the chambers without requiring the top and bottom pieces to be as stiff as these sidewall pieces extending between them. The sidewalls or portions thereof can also be preformed to have different shapes and effects before being secured to the top and bottom pieces of the bladder.

The location of the seam can be varied so the inverted seam is not located in the center of the sidewall or in a bladder window. The size of the pieces of sidewall barrier material determine the location of the inverted seam(s). If the pieces are substantially equivalent in size, the seam will occur in the center of the sidewalls. If they differ in size, the seam will be offset from the center of the sidewall. The greater the size difference, the greater the offset. The sidewall pieces can be sized so the offset, inverted seam occurs proximate the top or bottom barrier sheet. In this instance, the larger piece forms a larger part of the sidewall and is the portion exposed in the bladder window. The smaller sidewall piece and offset seam can be covered by midsole or upper materials. The seams formed between the sidewalls and the top and bottom barrier sheets can be used as a gasket or reference point when introducing a midsole within a mold.

These and other features and advantages of the invention may be more completely understood from the following detailed description of the preferred embodiment of the invention with reference to the accompanying drawings.

BRIEF DESCRIPTION OF THE DRAWINGS

FIG. 19 is a top plan view of the bladder of FIG. 18, shown sealed and inflated.

FIG. 20 is a cross sectional view of the bladder taken along line 20-20 of FIG. 19.

FIG. 21 is a cross sectional view of the bladder taken along line 21-21 of FIG. 19.

DETAILED DESCRIPTION OF THE PREFERRED EMBODIMENTS

Figure 1:
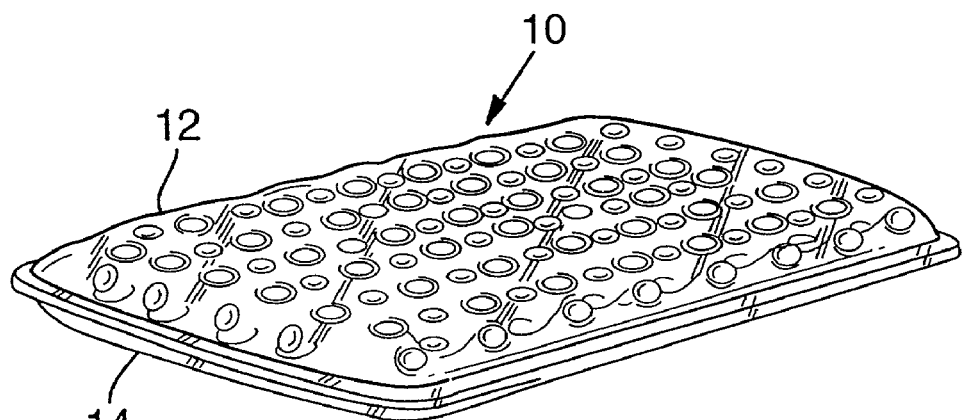
FIG. 1 is a perspective view of a bladder constructed of three film layers in accordance with an embodiment of the present invention.

Reference is made to the figures which illustrate some permutations of preferred embodiments of multiple film layer bladders. Due to the complex geometries of multiple film layer bladders, for the sake of clarity, in some instances the perspective views of the bladders are illustrated as if the outer film layers are opaque with the inner construction shown in cross section. It is understood that the film layers may be transparent, tinted or opaque, or some combination of films of different appearance. The term "connection site" is used throughout the application to refer broadly to attachment locations between any of the film layers. A convention employed in the drawings is to show connection sites by outline only or as an outline surrounded by arcs. The sites with arcs depict a connection between an inner film layer and the outer film layer closest to the viewer. The sites showing only the connection outline depict a connection between two inner film layers, or between an inner film layer and the outer film layer furthest from the viewer. The connection sites may be in the form of circular dots, bars, extended lines or any other geometric shape employed to attach any of the film layers to one another. As will be seen in the various preferred embodiments, the outer layers forming the envelope are attached to one another at least along the periphery, and any number of inner layers are attached to one another or to an outer layer.

All of the figures depict configurations of bladders or parts of bladders which are sealed and filled with fluid. That is, the illustrations are of fluid filled shapes that take form due to the pattern of attachments of the flat film layers.

For ease of explanation, reference is made to various features of a wearer's foot to clarify directions or locations along the bladders described. The toe, forefoot, metatarsal, arch and heel are used for their customary meanings.

"Medial" refers to the sides of a wearer's feet which would face one another, and "lateral" refers to the outside of a wearer's foot.

Figure 2:
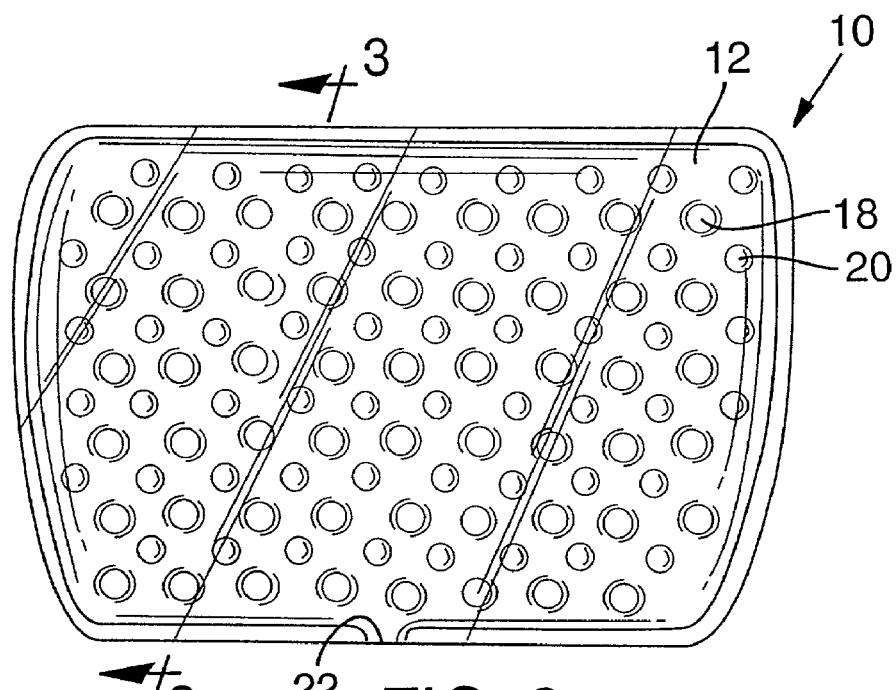
FIG. 2 is a top plan view of the bladder of FIG. 1.
Figure 3:
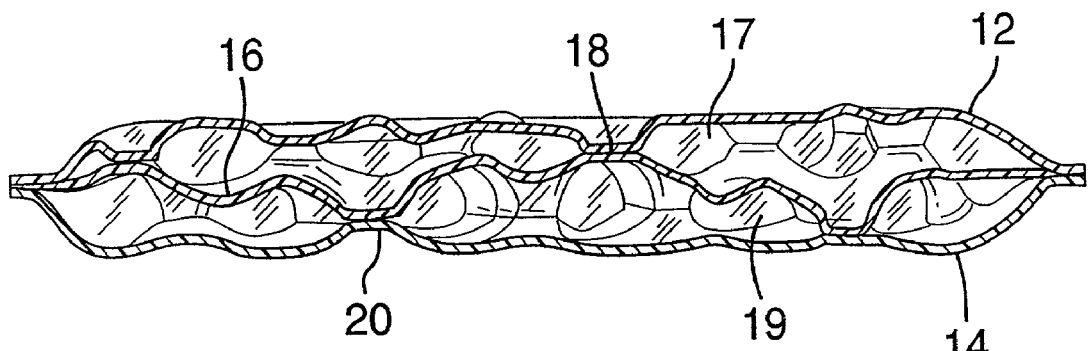
FIG. 3 is a cross sectional view of the bladder taken along line 3-3 of FIG. 2.

A preferred embodiment of a multiple film layer bladder 10 is shown in FIGS. 1-3 which comprises two outer film layers 12 and 14 forming the outer envelope of the bladder, and an inner film layer 16 placed between the outer film layers. Inner film layer 16 forms an inner boundary between two fluid filled layers 17 and 19. Inner film layer 16 is connected to film layers 12 and 14 at connection sites 18 and 20 respectively and along the perimeter to isolate fluid layers 17 and 19 out of fluid communication from one another. In this embodiment the connection sites are formed as circular dot welds. As can be seen in the cross-section views of FIG. 3, connection sites 18 and 20 enable middle film layer 16 to act as a tensile member, extending between outer film layers 12 and 14 and interconnecting them together. Middle film layer 16 also provides a generally evenly contoured outer surface to bladder 10 by virtue of the placement of the connection sites with the outer film layers. Bladder 10 has a filling stem (not shown) which is welded closed after the bladder is filled with fluid. In a finished bladder, the filling stems may be removed leaving a weld location 22 intact to prevent loss of pressure. The shape of bladder 10 makes it suitable for use in a forefoot area to provide cushioning under the metatarsal area of a wearer's foot.

Figure 4:
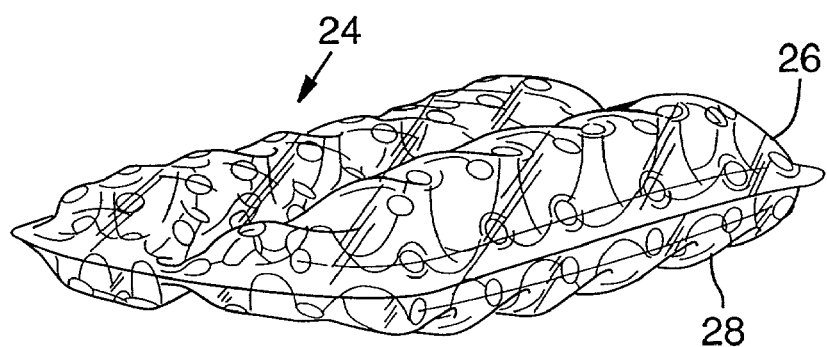
FIG. 4 is a perspective view of another bladder constructed of three film layers to illustrate contouring of the outer surfaces by placement of the connection sites.
Figure 5:
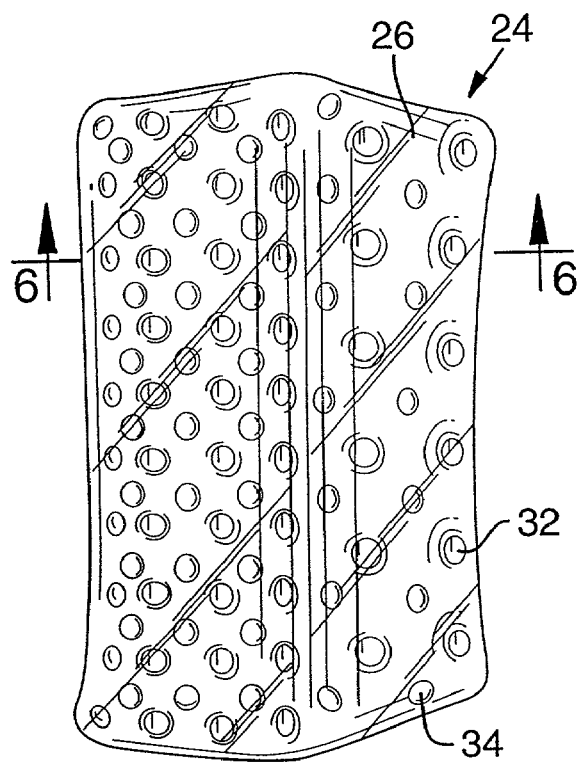
FIG. 5 is a top plan view of the bladder of FIG. 4.
Figure 6:
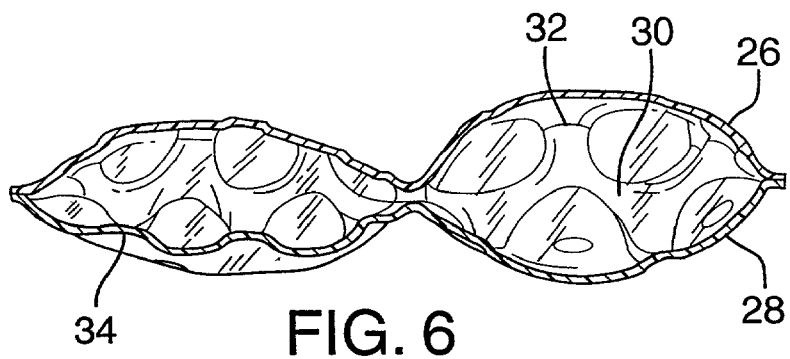
FIG. 6 is a cross sectional view of the bladder taken along line 6-6 of FIG. 5.

Another three film layer bladder 24 is depicted in FIGS. 4-6 which illustrates the variances in surface contour and thickness of the bladder achieved by varying the placement of weld locations of the inner film layer to each of the outer film layers. Bladder 24 is comprised of outer film layers 26 and 28, and one inner film layer 30 interposed between the outer film layers and interconnecting them. Connection sites 32 and 34 respectively connect inner film layer 30 to outer film layers 26 and 28. In the cross-sectional view, inner film layer 30 can be seen extending between the outer layers. As is apparent from the drawings, to form a thinner portion of bladder 24 the connection sites are spaced closer together, and to form a thicker portion, the connection sites are spaced further apart. The contrast between the two is shown in FIG. 6. Bladder 24 is intended to illustrate the principle of connection site placement and the resultant effect on the thickness and outer surface contour of the bladder.

Figure 7:
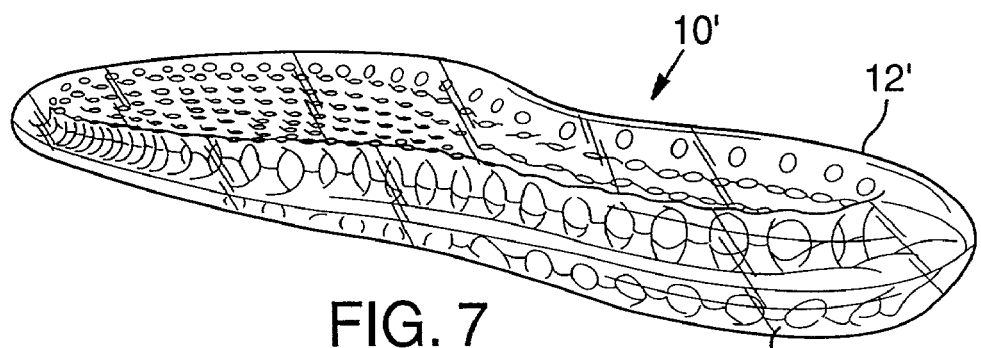
FIG. 7 is a perspective view of a full-foot bladder constructed of three film layers in accordance with another embodiment of the present invention.
Figure 8:
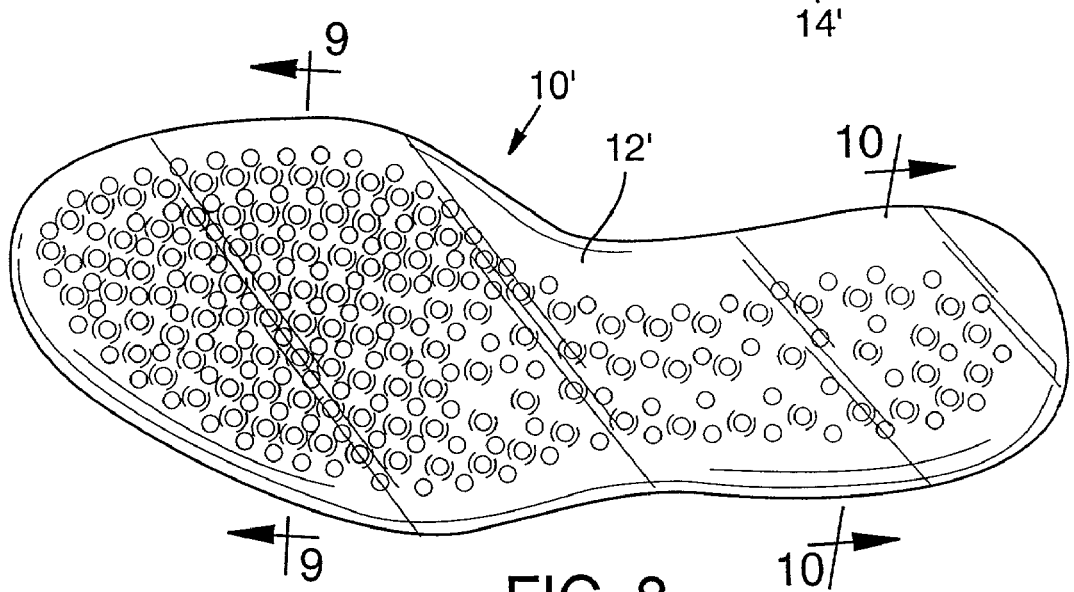
FIG. 8 is a top plan view of the bladder of FIG. 7.
Figure 9:
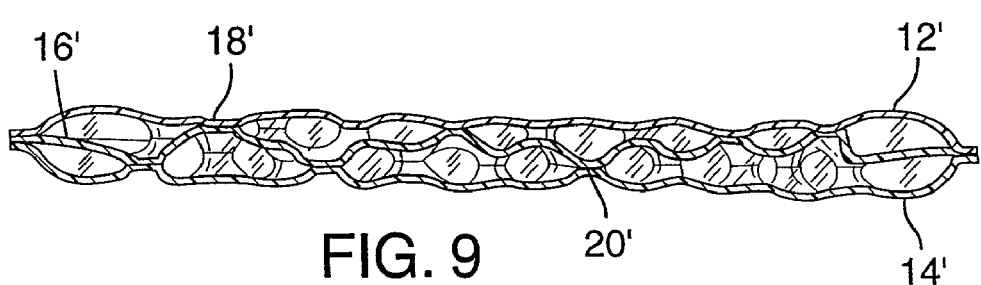
FIG. 9 is a cross sectional view of the bladder taken along line 9-9 of FIG. 8.
Figure 10:
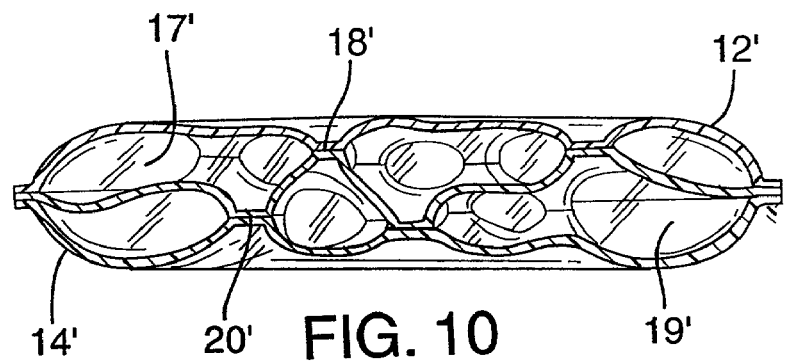
FIG. 10 is a cross sectional view of the bladder taken along line 10-10 of FIG. 8.

A full-foot three film layer bladder is shown in FIGS. 7-10 and the same reference numbers as those used to describe the bladder of FIGS. 1-3 are used with a prime symbol. Bladder 10' is comprised of outer film layers 12' and 14' with an inner film layer 16' interposed between. Inner film layer 16' is attached to the outer film layers along the perimeter and at various connection sites 18' and 20'. The film layers define two fluid filled layers 17' and 20' which may be pressurized to the same or different pressures. As can be seen in FIGS. 7 and 10 in particular, the topography or outer contour of the bladder is varied to make the edges in the heel area form a slight cup or cradle in the center to improve stability. This is seen in FIG. 10 in that the film layers are attached to one another to provide a thinner profile in the center. The connection sites near the edge of the bladder are further apart to provide a thicker profile.

Three film bladders provide two layers of fluid which impart cushioning and response characteristics to the bladder and reduces the dependence on any foam used in the shoe sole. The two fluid layers may be of equal pressure or differing pressures depending on the particular cushioning profile desired. For example, if a lower pressure fluid layer is placed closest to a wearer's foot, the shoe sole would impart a softer or springier feel to the wearer. Depending upon the activity for which the shoe is designed, the pressure of the fluid layers may be adjusted and fine tuned to obtain the most desired response and feel. Inflation of the bladder is achieved through a valve stem that is open to all fluid layers. As the fluid layers reach their desired pressure, the film layers defining that fluid layer can be sealed at the valve stem to cease inflation of that fluid layer while other layers continue to be pressurized. Sequential sealing of the appropriate film layers in the valve area will enable customized pressurization of the various fluid filled layers of the bladder. This principle can be applied to any number of film layers.

Figure 57A:
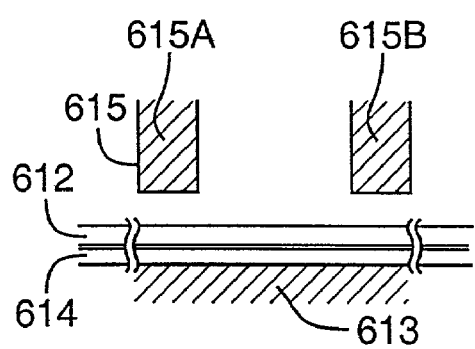
FIGS. 57A to 57F are diagrammatic illustrations of a bladder inflation technique.
Figure 57B:
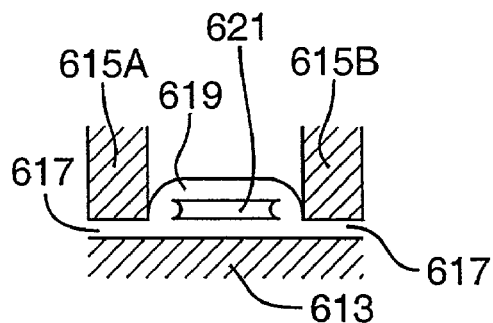
Figure 57C:
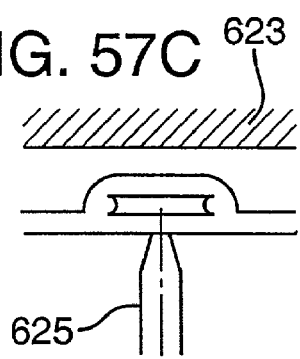
Figure 57D:
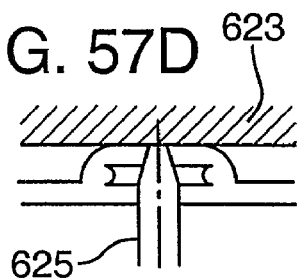
Figure 57E:
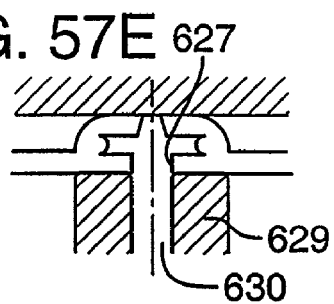
Figure 57F:
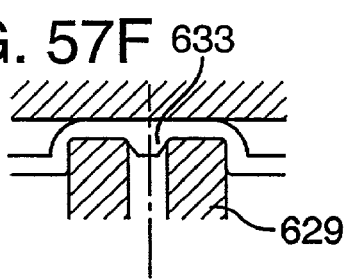

An alternate inflation technique is illustrated in FIGS. 57A to 57F. For ease of explanation, the inflation of a bladder formed of only two film layers 612 and 614 is illustrated in these figures. As seen in FIG. 57A, sheets 612, 614 are placed one above the other on plate 613, and a die 615 is aligned above plate 613. Die 615 is formed of spaced die plates 615A and 615B, which are used to form an inflation channel. Die plates 615A and 615B are lowered (FIG. 57B) to apply heat and pressure to film layers 612 and 614. Compressed weld areas 617 are formed immediately beneath die plates 615A and 615B, and a weld bead 619 is formed between die plates 615A and 615B. An inflation opening 621 is formed within weld bead 619, and extends to the chambers of the bladder (not shown) which are to be inflated. As seen in FIGS. 57C and 57D, weld bead 619 is placed against a cutting surface 623 and a cutting punch 625, cuts in inlet port 627 (FIG. 57E) to inflation opening 621. An electrode 629, with a gas supply opening 630 is pressed against weld bead 619 (FIG. 57E) and an inflation gas is passed through supply opening 630 and inlet port 627 to inflation opening 621 and the chambers of the bladder being inflated. Electrode 629 is preferably cylindrical in shape, and applies heat and pressure to weld bead 621 to fuse the inlet port and inlet opening closed with a weld 633 after inflation of the chambers has been completed.

Figure 11:
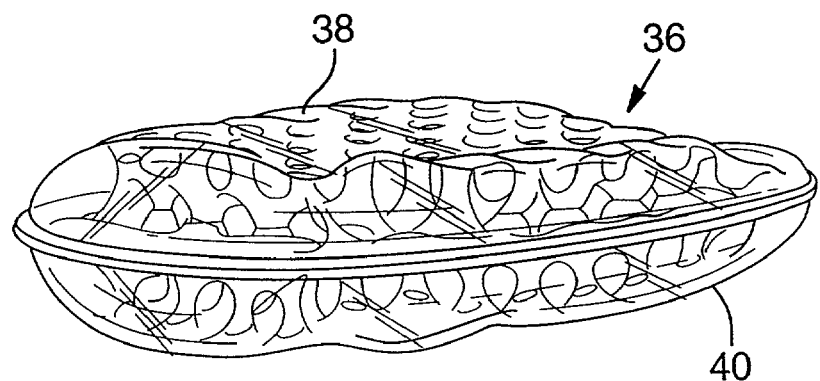
FIG. 11 is a perspective view of a heel bladder constructed of four film layers in accordance with another embodiment of the present invention.
Figure 12:
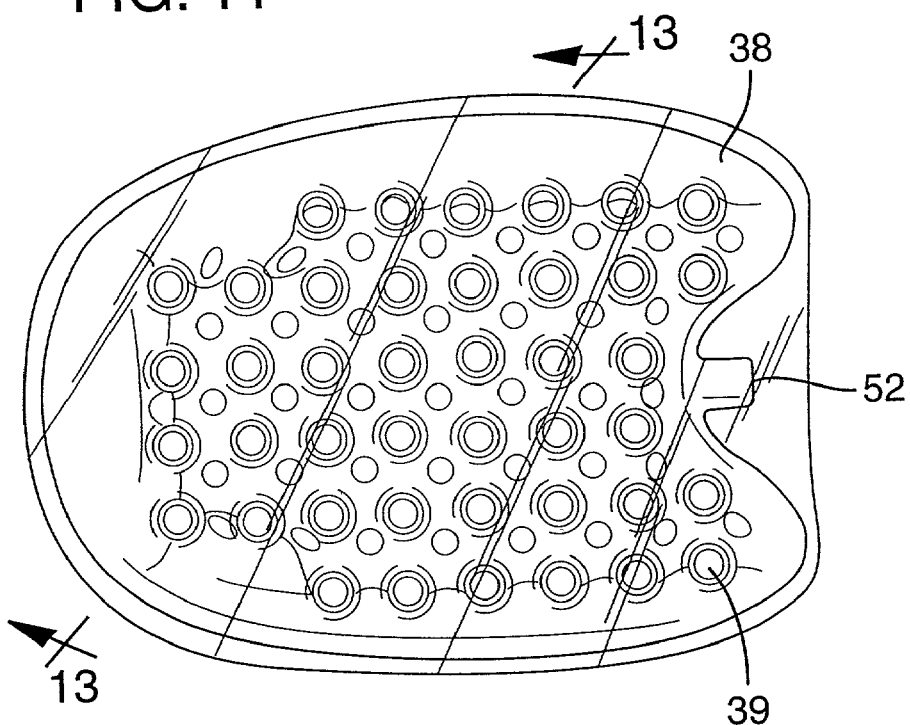
FIG. 12 is a top plan view of the bladder of FIG. 11.
Figure 13:
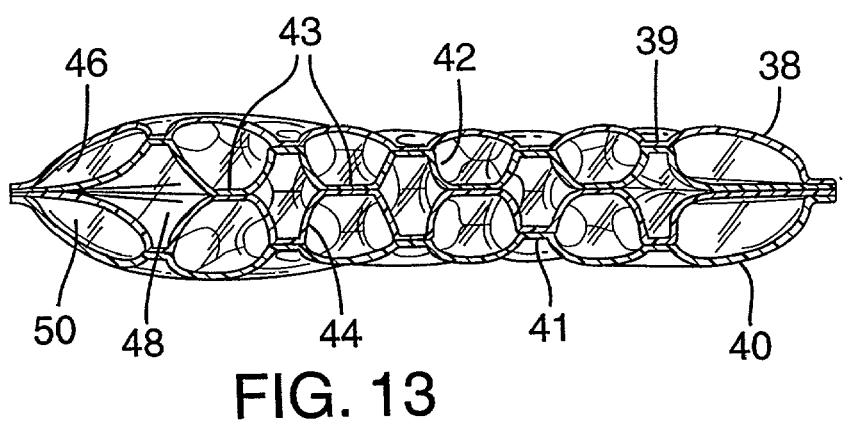
FIG. 13 is a cross sectional view of the bladder taken along line 13-13 of FIG. 12.

Referring now to FIGS. 11-13, a relatively simple four film layer embodiment of the present invention is disclosed in which the connection sites are generally arranged in an orthogonal array. Bladder 36 comprises outer film layers 38 and 40 which are attached to inner film layers 42 and 44 at connection sites 39 and 41, respectively. Inner film layers 42 and 44 are attached to one another at connection sites 43 which are incoincident, that is, not in alignment, with their connection sites to the outer film layers. As illustrated in the sectional view of FIG. 13, this results in inner layers 42 and 44 extending between outer layers 38 and 40 and acting as a tensile member for the bladder.

Four film layers results in a bladder with three vertically stacked fluid layers through any cushioning profile: a first outer fluid layer 46; a middle fluid layer 48 and a second outer fluid layer 50. In the embodiment of FIGS. 11-13, middle fluid layer 48 comprises a series of tubular spaces filled with fluid. In a simple form, these three fluid layers may be pressurized to different pressures to obtain a desired cushioning profile. For instance, if a soft-firm-soft profile were desired as one giving the best cushioning feel to a wearer while providing high pressure fluid in the middle fluid layer for responding to high impact loads, the outer fluid layers could be pressurized to $P_1$ with the inner fluid layer being pressurized to $P_2$, where $P_1 < P_2$. Alternatively, all three fluid layers could be pressurized to different pressures to further customize the cushioning profile.

Besides being divided into three vertically stacked fluid layers, bladder 36 could be subdivided further into discrete chambers within each fluid layer to further develop the cushioning profile. Inner film layers 42 and 44 could be attached to one another in a more complex relationship so as to afford multiple middle fluid layer chambers. Similarly, the attachment between an outer film layer 38 or 40 with an adjacent inner film layer could be developed further to afford multiple fluid chambers in the outer fluid layers. A more detailed discussion of the formation of discrete chambers within a fluid layer is found in the discussion of FIGS. 14-17.

In this particular embodiment, bladder 36 is well suited for use in a heel area of a shoe sole with the curved semicircular end being aligned with the rear portion of a wearer's heel. In this manner, stem 52 would be located near the arch area of a wearer's foot. Stem 52 could be located at any convenient peripheral location, and would likely be removed altogether once bladder 36 is filled with fluid and the stem area sealed.

Consistent with the discussion above, the locations of the connection sites between the inner film layers with one another, and the connection sites between any inner film layer with an adjacent outer film layer, determines the thickness and profile of the resulting bladder. In addition, the particular configuration of the connection sites can be adjusted to form internal fluid filled chambers.

The embodiments described heretofore are partial foot bladders of relatively simple construction using circular dot welds as connection sites. The principles of the multiple film layer and multiple fluid layer bladder can be applied to any suitable bladder shape and application as will be seen in the following embodiments.

A full-foot bladder 54 is shown in FIGS. 14-17 comprising four film layers bonded to one another with increased geometric complexity. This bladder defines two discrete chambers or fluid layers which are isolated from fluid communication from one another. In the exploded perspective view, FIG. 14, two outer film layers are aligned with the inner film layers as they would be attached together. The outer film layers are shown as they would appear in a sealed and inflated bladder. In an uninflated state, all of the film layers are flat.

Bladder 54 comprises outer film layers 56 and 58, and inner film layers 60 and 62. Outer film layers 56 and 58 are sealed along their peripheries to form an envelope, and inner film layers 60 and 62 are sealed along their peripheries to form an inner envelope. Inner film layers 60 and 62 are attached to one another and to adjacent outer film layers 56 and 58 respectively. The peripheral seal of the inner film layers is spaced away from the peripheral seal of the outer film layers at certain points along the edges of the bladder to define gaps 59. These gaps 59 help keep the upper fluid layer in fluid communication with the lower fluid layer along the bladder.

Outer film layer 56 is attached to an adjacent inner film layer 60 at circular connection sites 64 and elongated connection sites 66. Identical reference numerals are used to refer to corresponding connection sites between outer film layer 58 and inner film layer 62. Inner film layers 60 and 62 are attached to one another at circular connection sites 68 and elongated connection sites 70.

Figure 16:
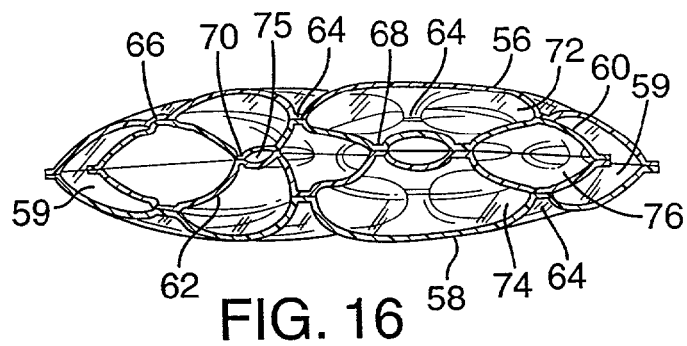
FIG. 16 is a cross section of the bladder taken along line 16-16 of FIG. 15.
Figure 17:
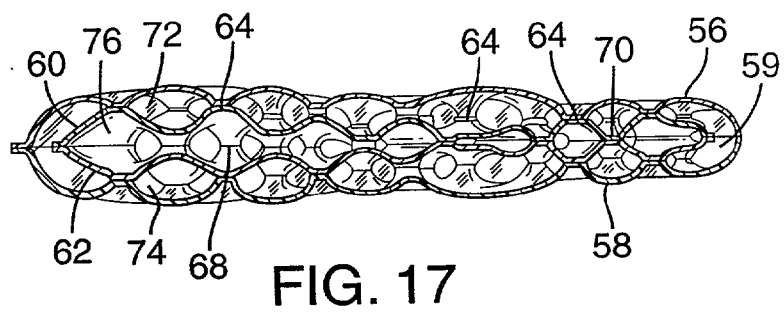
FIG. 17 is a cross section of the bladder taken along line 17-17 of FIG. 15.

FIGS. 16 and 17 illustrate cushioning profiles of bladder 54 taken through various portions of the bladder. In this particular embodiment, the four film layers are interconnected to one another so as to provide an upper fluid layer and a lower fluid layer. The middle fluid layer is formed between the inner film layers, and is formed with a plurality of sub-chambers. As seen in the cross-sectional views, there are three fluid filled layers, some of which are vertically stacked and others which are vertically offset from one another in a vertical profile.

For example, in the heel area, FIG. 16, fluid layer 72 is formed between outer film layer 56 and an adjacent inner film layer 60, and a fluid layer 74 is formed between outer film layer 58 and an adjacent inner film layer 62.

For example, in the forefoot area, FIG. 17, a fluid filled layer 72 formed between an outer film layer 56 and an adjacent inner film layer 60 is vertically aligned with fluid filled layer 74 formed between outer film layer 58 and an adjacent inner film layer 62. A central fluid filled layer 76 is formed between inner film layers 60 and 62, and is vertically offset from fluid filled layers 74 and 72.

It will be apparent that any differences in the locations of the connection sites will result in vertical stacking of some sub-chambers or portions of sub-chambers in any given layer. In the forefoot area, upper and lower fluid layers 72 and 74 are vertically aligned while middle fluid layer 76 is vertically offset from the two outer layers.

As seen in detail in FIGS. 16 and 17, bladder 54 is constructed so that the edges of inner film layers 60 and 62 are not connected to the peripheral connection between outer film layers 56 and 58 in some areas. Separating the edges of the inner film layers from the outer film layers provides another degree of freedom in constructing the bladder. In general, wherever the edges of all of the film layers are bonded, the profile at that location will be flatter than the areas where the edges of the inner layers are separate from the edges of the outer film layers.

By varying the levels of pressurization of the fluid filled layers, any desired cushioning profile can be achieved. For instance, taking the cushioning profile of FIGS. 16 and 17, if the pressurization of the outer fluid filed layers 72 and 74 is lower than the pressurization of central fluid filled layer 76, the resulting cushioning profile will be soft-hard-soft. This is a desired profile for providing soft point of purchase feel and a desirable response for repeated, relatively light loads such as in walking. The higher pressure inner fluid filled layer responds appropriately to higher impact loads such as during jumping or running.

Figure 14:
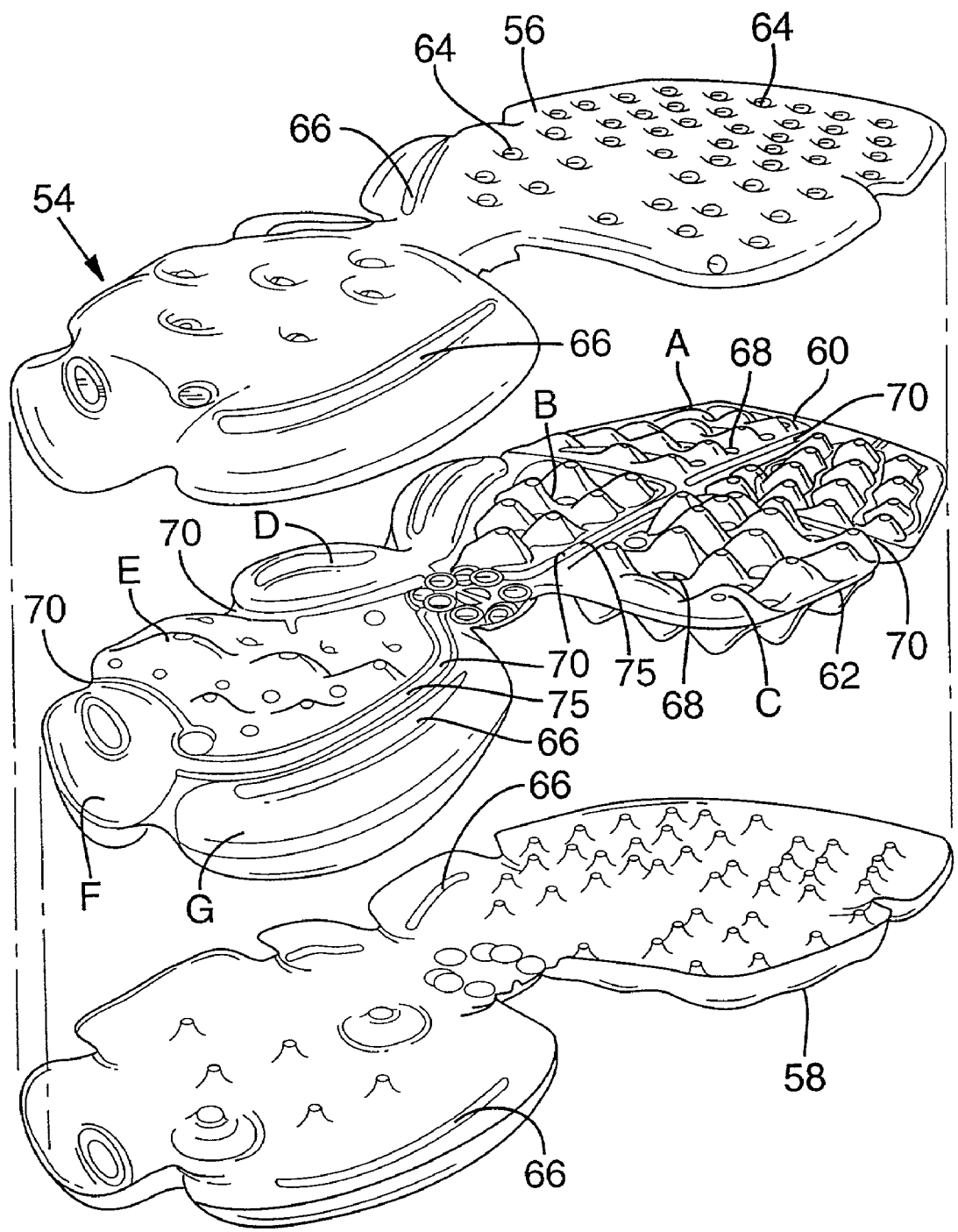
FIG. 14 is an exploded view of the alignment of an inner bladder to outer film layers of a bladder in accordance with yet another embodiment of the present invention.
Figure 15:
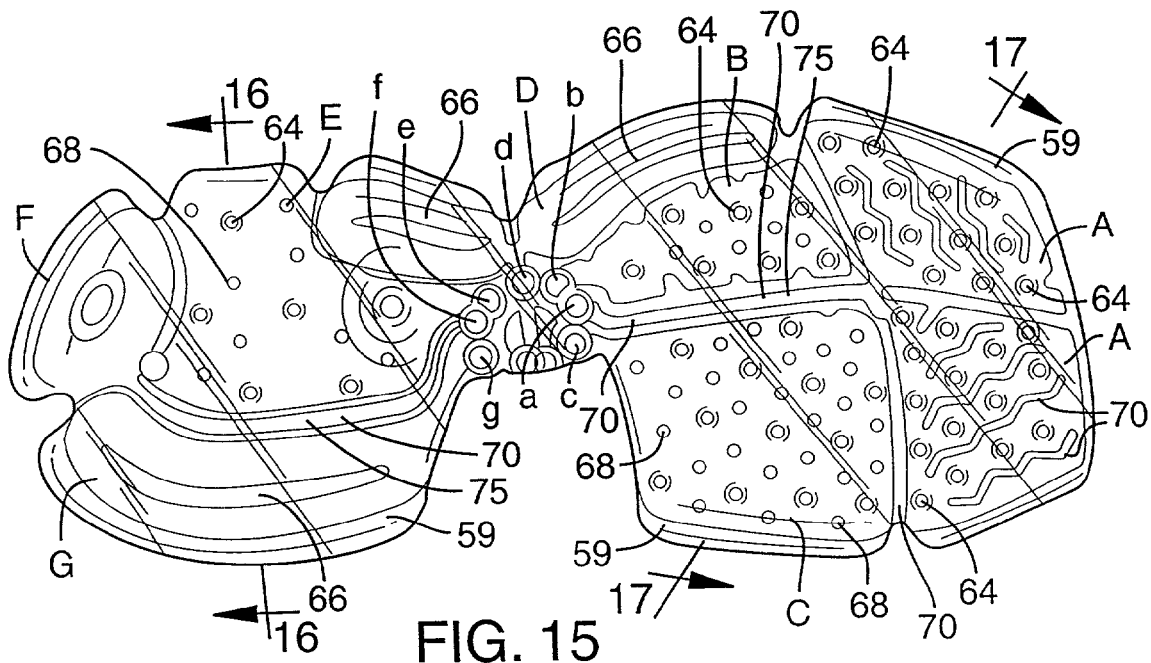
FIG. 15 is a top plan view of the bladder of FIG. 14, shown sealed and inflated.

As best seen in FIGS. 14 and 15, elongated connection sites 70 divide the middle fluid layer into a plurality of discrete sub-chambers A, B, C, D, E, F, and G. Each of these sub-chambers is inflated through a separate inlet port "a" through "g," respectively, so that each sub-chamber can be inflated to a different pressure. The inlet ports are illustrated in their post-inflation state, sealed by a circular weld. Some of the elongated connection sites define narrow inflation channels 75 which provide communication from an inlet port to one of the sub-chambers. In this manner, the cushioning and support provided by the middle fluid layer can be fine tuned along the plane of the foot. For example, chamber "G" can be inflated to 30 psi to provide medial support. Chamber "C" can be inflated to 5 psi to cushion the first metatarsal head. Chamber "F" can be inflated to 5 psi to function as a heel crash pad at foot strike. Chamber "E can be inflated to 20 psi for heel cushioning. Lateral chamber "D" can be inflated to 10 psi for lateral arch support. Forefoot chamber "A" can be inflated to 25 psi and lateral forefoot chamber "B" can be inflated to 15 psi, so that both of these chambers provide forefoot cushioning.

In accordance with the principles of the invention, the connection sites can be arranged as to vary the height of the cushioning profile anywhere along the bladder. The shape of location of the connection sites can also be varied to obtain multiple chambers along any fluid filled layer or between fluid filled layers.

Another full foot bladder 78, illustrated in FIGS. 18-21, comprises four film layers bonded to one another with mostly elongated connection sites includes outer film layers 80 and 82 and inner film layers 84 and 86. As with the previous embodiment, these film layers are illustrated as they would be shaped when the bladder is inflated. In the uninflated state, they would be flat films. Outer film layers 80 and 82 are sealed along their peripheries to form an envelope. Inner film layers 84 and 86 are attached to one another at connection sites 88 to define therebetween a middle fluid filled layer 90. Inner film layer 84 is attached to outer film layer 80 at connection sites 92 to define therebetween a fluid filled layer 94. Similarly, inner film layer 86 is attached to outer film layer 82 at connection sites 96 to define therebetween another fluid filled layer 98. FIG. 19 illustrates a plan view of inner film layer 84 and connection sites 88.

FIGS. 20-21 illustrate cushioning profiles of bladder 78 taken through various portions of the bladder. The four film layers are interconnected to one another to form a plurality of sub-chambers within each fluid filled layer when viewed in cross section. There are generally three fluid filled layers 90, 94 and 98, some of which are vertically stacked, and others which are vertically offset from one another in a vertical profile.

For example, in the heel area, FIG. 21, outer fluid layers 94 and 98 make up much of the cross-sectional area in the central portion, with inner fluid layer 90 being relatively small in cross-section. In the forefoot area, FIG. 20, fluid filled layer 94 formed between an outer film layer 80 and an adjacent inner film layer 84 is vertically aligned with fluid filled layer 98 formed between outer film layer 82 and an adjacent inner film layer 86. Central fluid filled layer 90 is formed between inner film layers 84 and 86, and is vertically offset from fluid filled layers 94 and 98.

Similar to the embodiment illustrated in FIGS. 14-17, certain connection sites 88 divide middle fluid layer 90 into a plurality of discrete chambers A, B, C, D, E, and F, which are inflated through inlet ports "a" through "f," respectively.

Figure 18:
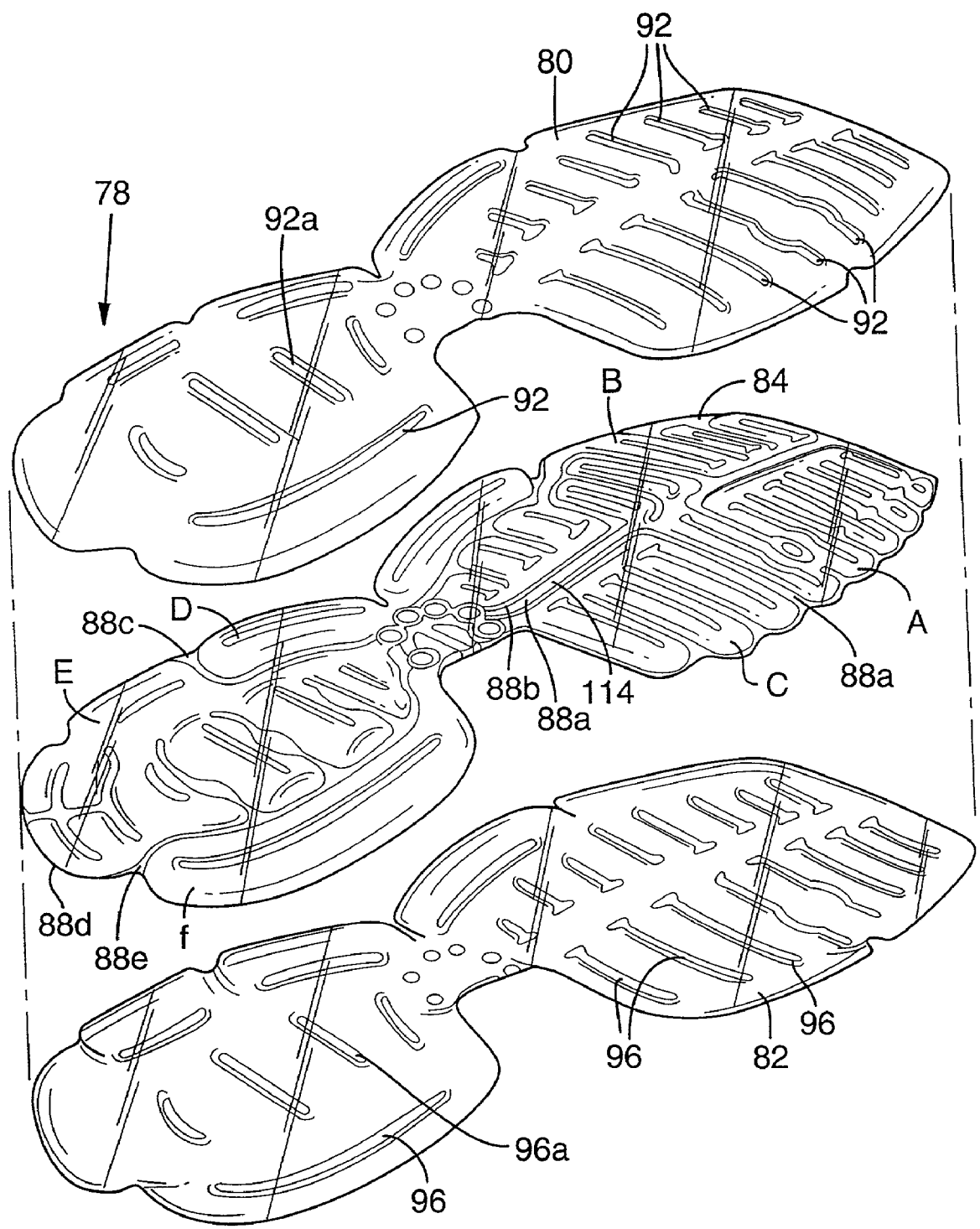
FIG. 18 is an exploded view of the alignment of an inner bladder to outer film layers of a bladder in accordance with still another embodiment of the present invention.

The detailed cushioning profile of the forefoot and the discrete chambers therein, FIG. 20, can best be understood with reference to the FIG. 18 in which inner medial chamber C is formed between connection site 88a which extends longitudinally and medially to surround chamber C. Surrounding inner medial chamber C are fluid filled layers 94 and 98 which are formed between each of the outer film layers and an adjacent inner film layer. Connection site 88b separates chamber B from chamber A, and with connection site 88a defines a fluid inlet channel 114 from inlet port "a" to chamber A. Generally in the center of the forefoot, outer fluid layers 94 and 98 surround fluid inlet channel 114. Toward the lateral side of the bladder, two inner chambers B and D are formed between inner film layers 84 and 86 with a connection site 88c isolating the chambers from one another. Outer connection site 92 attaches outer film layer 80 to inner film layer 84, with a mirror image connection site 96 that attaches outer film layer 82 to inner film layer 86. By arrangement of the connection sites between the four film layers, a cushioning profile of stacked fluid filled layers as seen in FIG. 20 results. The pressures within the various chambers can be equal or unequal depending upon the response characteristics desired.

The detailed cushioning profile of the heel area, and the discrete chambers therein, is illustrated in FIG. 21 and is also best understood with reference to FIG. 18. The profile of FIG. 21 is a cross-sectional view so that the relationships of the four film layers can be seen beyond line 21-21 of FIG. 19. Beginning at the medial side of the bladder, inner chamber F is defined between the inner film layers by virtue of a peripheral connection site 88d and connection site 88e. The inner chamber is attached to outer film layers 80 and 82 at connection sites 92 and 96 respectively. Outer films layers 80 and 82 extend transversely to the lateral side of the bladder and are attached to inner film layers 84 and 86 at other connection sites 92 and 96. Inner chamber D is formed between the inner film layers by virtue of peripheral connection site 88d and connection site 88c. Another inner chamber E is located between medial inner chamber F and lateral inner chamber D. Connection site 92a between outer film layer 80 and inner film layer 84 is shown in FIG. 21 to illustrate the structure of the fluid filled bladder. Connection site 92a is illustrative of the connection sites between the outer film layers and inner film layers. Inner film layers 84 and 86 are in tension in the fluid filled bladder as seen in FIGS. 20 and 21, and it can be seen that the size and location of connection site 92a and an aligned connection site 96a determines the spacing between the outer films layers of a fluid filled bladder.

Bladder 78 of FIGS. 18-21 is constructed so that all of the edges of inner film layers 84 and 86 are joined to the peripheral edges of outer film layers 80 and 82. This generally results in a flatter cushioning profile near the edges of the bladder. Again, varying the levels of pressurization of the fluid filled layers will provide differing cushioning profiles.

In accordance with the principles of the invention, the connection sites can be arranged as to vary the height of the cushioning profile anywhere along the bladder. The shape of location of the connection sites can also be varied to obtain multiple chambers along any fluid filled layer or between fluid filled layers.

Figure 22:
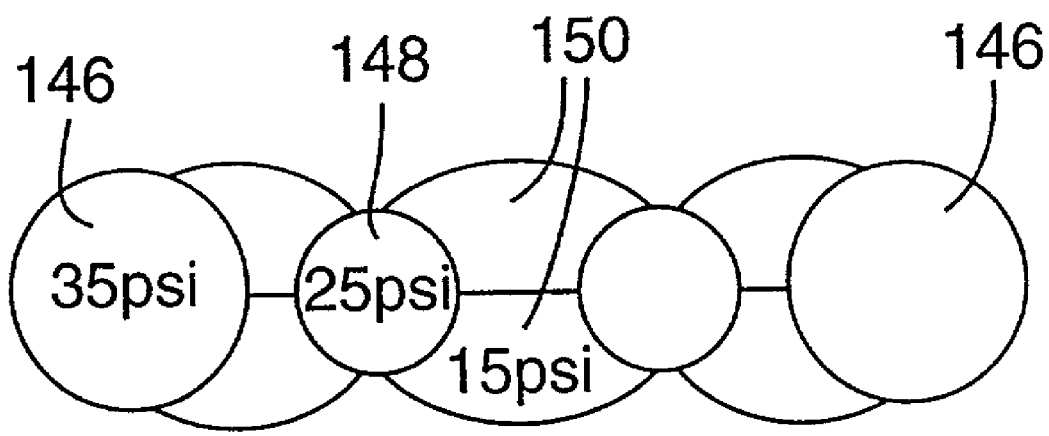
FIG. 22 is a schematic illustration of a section of a heel bladder in its static condition.
Figure 23:
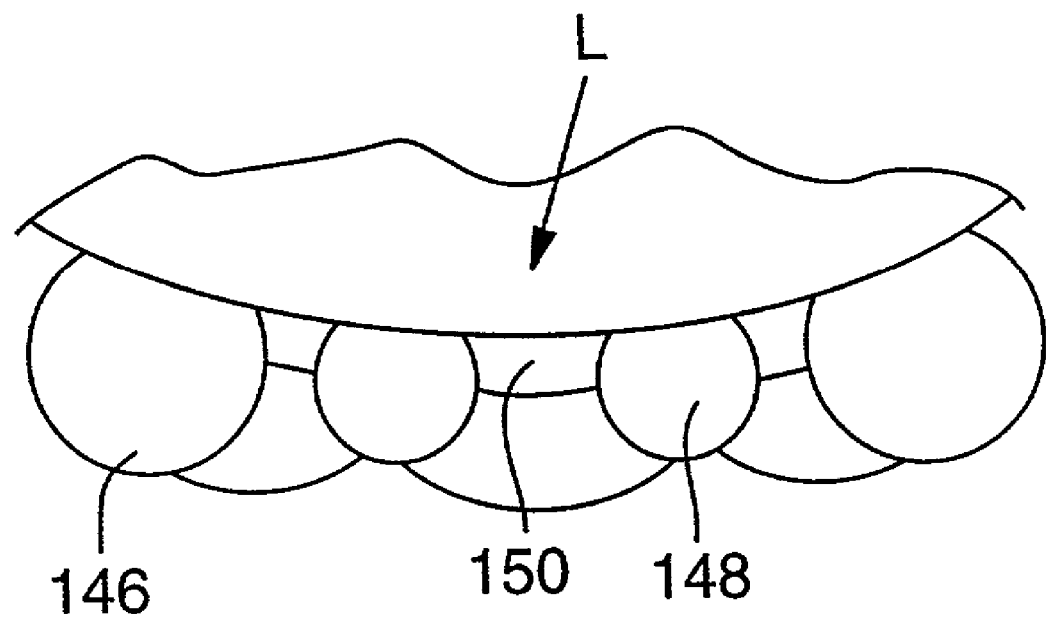
FIG. 23 is a schematic illustration of the section of FIG. 22 shown during loading.

An example of a soft-hard-soft cushioning profile in a four film layer bladder is shown schematically in FIGS. 22 and 23 in the unloaded and loaded condition. This cushioning profile is of the metatarsal head region. As will be apparent from the preceding discussion, side chambers 146 and central chambers 148 are formed from the inner film layers and top and bottom chambers 150 are formed between an outer film layer and an adjacent inner film layer. In this example, side chambers 146 are pressurized to 35 psi, inner chamber 148 are pressurized to 25 psi while the top and bottom chambers are pressurized to 15 psi. In this cushioning profile, the lower pressure chambers 150 will provide a soft point of purchase feel and general cushioning for light loads. When a high impact load L is applied, high pressure central chambers 148 will provide the needed dampening of the load, and higher pressure side chambers 146 will stabilize the wearer's foot by providing a stiffer response at the sides to cradle the curved metatarsal head of a wearer's foot. This profile illustrates an example of bladder construction and pressurization to provide anatomically coupled, regionalized cushioning for a wearer's foot.

Figure 24:
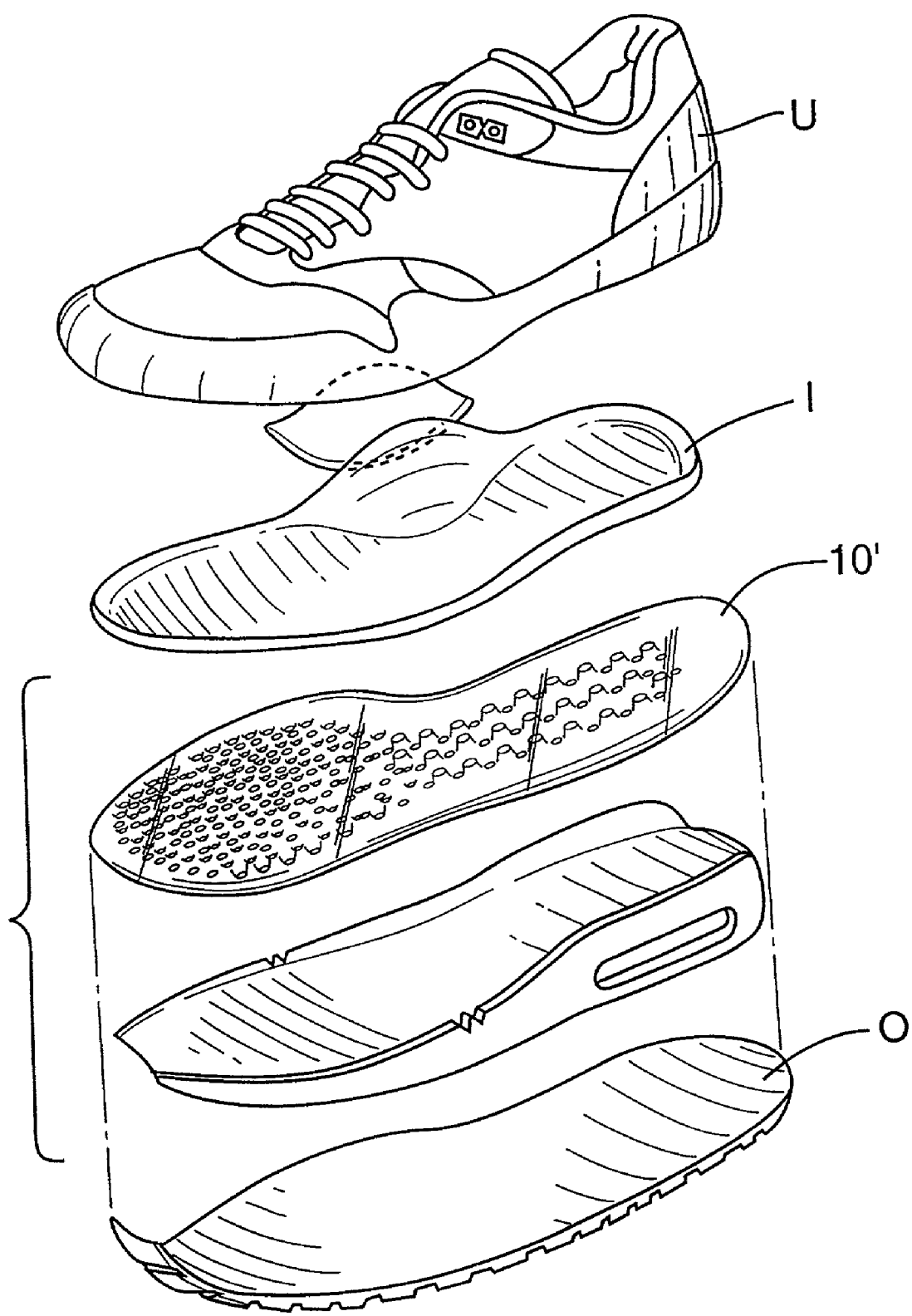
FIG. 24 is an exploded perspective view of a shoe incorporating the bladder of FIG. 7 in a sole assembly.

A bladder 10' is illustrated in FIG. 24 as part of a midsole assembly for a shoe S. The shoe comprises an upper U, an insole I, a midsole assembly M and an outsole O. While the full-foot bladder 10' is shown in the drawing, any of the bladders described herein or alternative constructions thereof can be substituted in the midsole assembly. Bladder 10' can be incorporated into midsole 60 by any conventional technique such as foam encapsulation or placement in a cut-out portion of a foam midsole. A suitable foam encapsulation technique is disclosed in U.S. Pat. No. 4,219,945 to Rudy, hereby incorporated by reference.

Although bladders with three film layers and four film layers have been described in detail, the invention is drawn broadly to multiple film layers defining fluid filled layers between them. Illustrations of the three and four film layer bladders clearly demonstrate the principles of the invention, and any number of film layers and configuration of fluid filled layers are within the scope of the present invention.

Figure 25A:
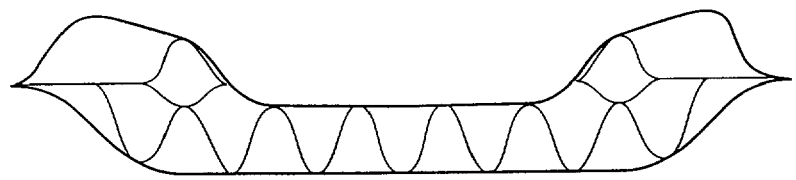
FIGS. 25A and 25B are schematic representations of a five layer bladder in accordance with the present invention.
Figure 25B:
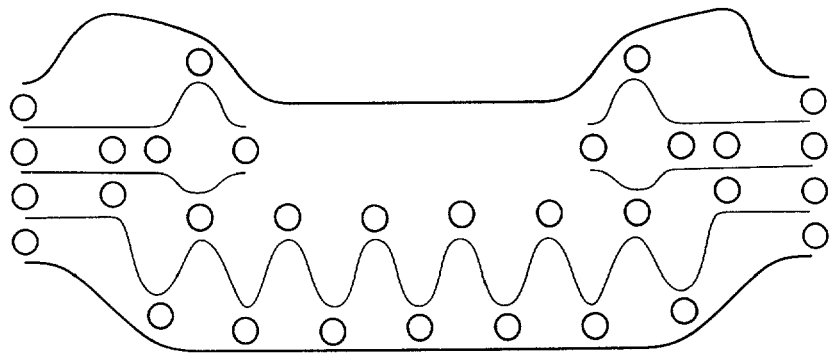
Figure 26A:
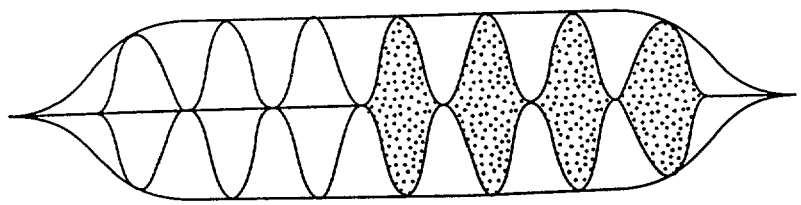
FIGS. 26A and 26B are schematic representations of a six layer bladder in accordance with the present invention.
Figure 26B:
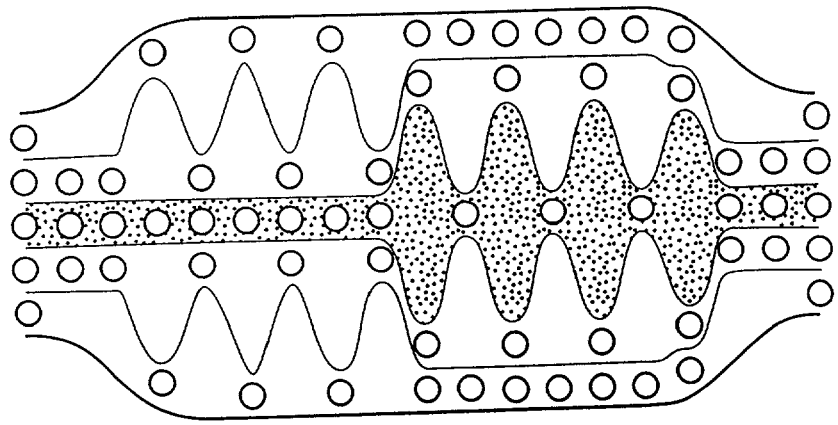
Figure 27:
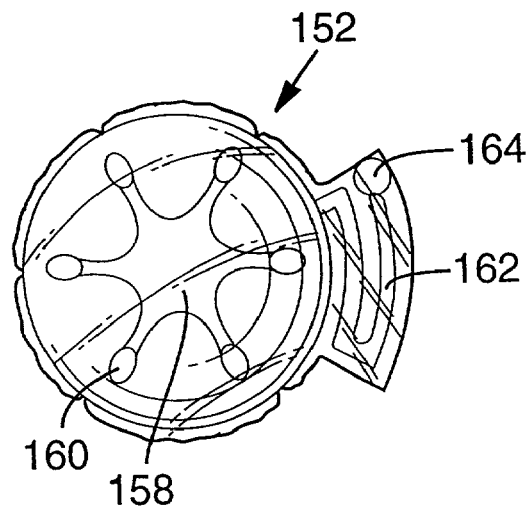
FIG. 27 is a top plan view of a complex-contoured three layer tensile bladder adaptable for use within a larger bladder in accordance with the present invention.
Figure 28:
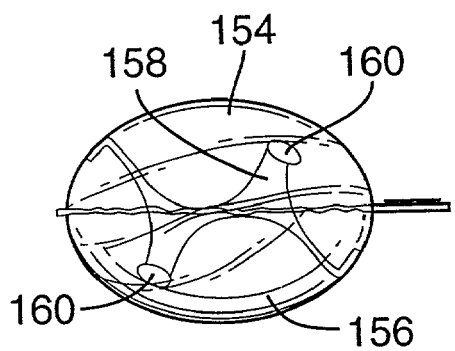
FIG. 28 is a side elevational view of the bladder of FIG. 27.
Figure 29:
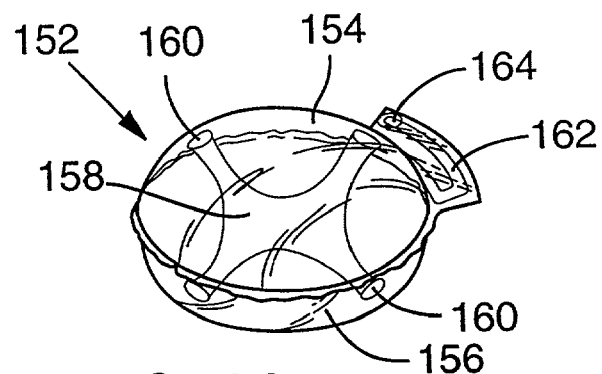
FIG. 29 is a perspective view of the bladder of FIG. 27.

Five and six film layer bladders have been constructed but are difficult to clearly illustrate in patent drawings due to their complexity. Cross-sectional schematic representations of bladders with five and six film layers are provided in FIGS. 25A, 25B, 26A, and 26B, respectively. FIGS. 25B and 26B are schematic representations of multi-layered bladders shown with the film layers exploded and with dots depicting connection sites between film layers. FIGS. 25A and 26A depict the bladders after the connections are made and the bladders are inflated. The five film layers of the bladder are clearly seen in FIG. 25A, and the contoured cross-section of the bladder is seen in FIG. 25A. At the medial and lateral edges, bladder chambers are stacked to form thicker edges, while a single layer of bladder chambers is centrally located.

The six layer bladder of FIGS. 26A and 26B illustrates several regions available for filling with fluid at different pressures. The bladder of FIGS. 26A and 26B is shown with shaded chambers to denote a different pressure from the unshaded chambers. If the shaded chambers were of a higher pressure than the unshaded chambers, the portion of the bladder including the higher pressure chambers would be more rigid and provide more support than the remainder of the bladder. Conversely, the lower pressure region would provide more cushioning than the remainder of the bladder. Thus, the right-hand side of the bladder as seen in FIGS. 26A and 26B would be more rigid and provide more support compared to the cushioning of the left-hand side of the bladder. One of ordinary skill in the art would be able to apply these principles to vary the pressurization in the chambers to customize the cushioning profile of the bladder.

FIGS. 27-31 illustrate another multi-layered bladder comprising three layer bladders placed within an open area of a four layer bladder. Three layer bladder 152 comprises an upper barrier layer 154, and a lower barrier layer 156 and a tensile element 158 disposed therein. Tensile element 158 comprises a single sheet of polyurethane film. To make bladder 152, tensile element 158 which is selectively die cut to the appropriate shape is placed between upper and lower barrier layers 154 and 156. Weld prevention material is selectively placed between the upper and lower barrier layers and the tensile element as desired, and the assembly is welded so that welds 160 are provided as shown. Upper and lower barrier layers 154 and 156 are then welded together around their periphery to seal bladder 152, and an inflation conduit 162 leading to an inflation point 164 is provided. Bladder 152 is then inflated through inflation point 164, after which inflation point is sealed. Similar to the first preferred embodiment, tensile element 158 is welded to the barrier layers which make up the envelope of bladder 152 when the films are in a flattened state so that the compressed or loaded condition of bladder 152 corresponds to the least stressed state of tensile element 158. Thus, tensile element 158 does not hamper the cushioning properties of the air when the inflated bladder is compressed. By selectively die cutting the interior sheet and selectively placing weld prevention materials alternately adjacent the upper and lower barrier layers, a variety of bladder shapes may be obtained.

Figure 30:
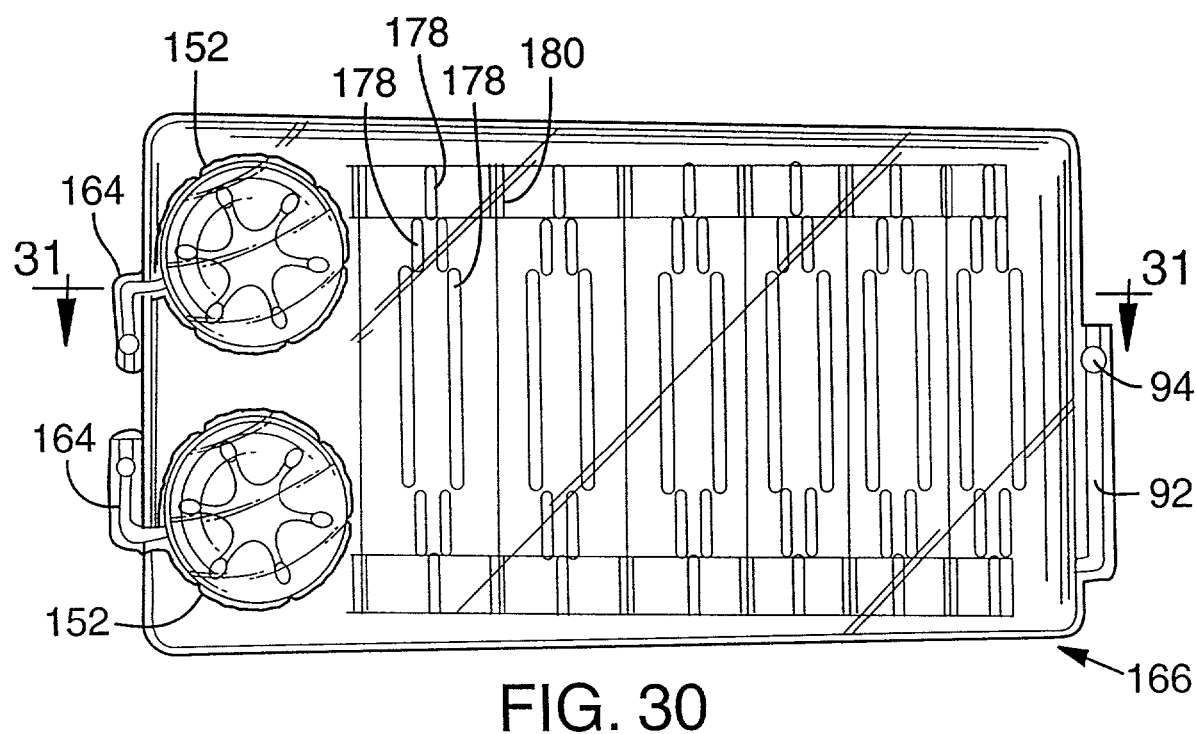
FIG. 30 is a top plan view of a seven layer tensile bladder in accordance with the present invention.
Figure 31:
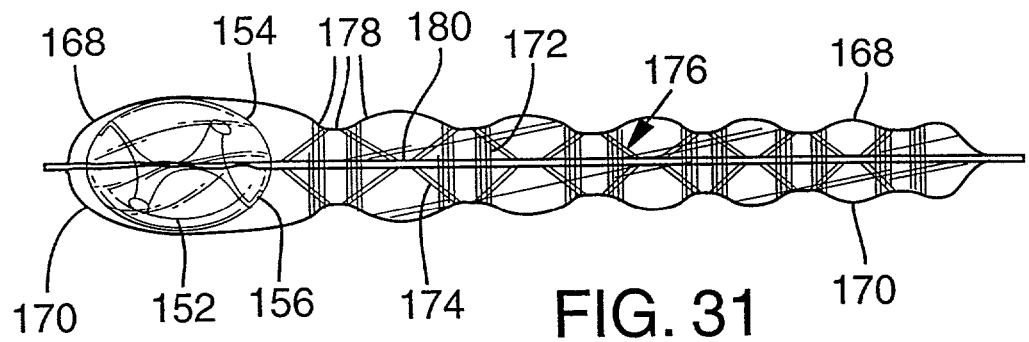
FIG. 31 is a cross-sectional view of the bladder of FIG. 30 taken along line 31-31.
Figure 32:
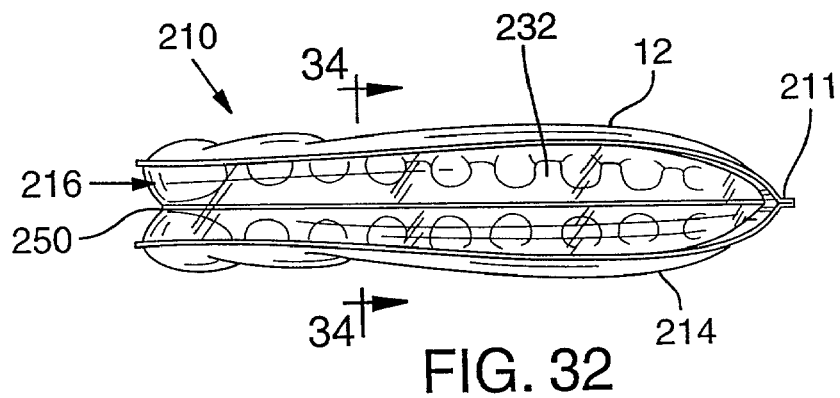
FIG. 32 is a side elevational view of a multiple film layer bladder having an inverted, sidewall seam formed from internal film layers in accordance with another embodiment of the present invention.

A three layer bladder such as bladder 152 can be placed within another bladder as shown in FIGS. 30-31 to construct a bladder with multiple cushioning regions and layers. Bladder 166 has a generally rectangular outline shape and comprises two outer layers 168 and 170 and two inner layers 172 and 174 attached to one another to form a tensile element 176 and interconnecting the outer layers in the main body of the bladder. Connection sites 178 between an outer layer and an inner layer are depicted as bars in the main body portion of bladder 166. An exemplary connection site between the inner layers is labeled 180 for illustration purposes. At one end of bladder 166, two three layer bladders 152 have been placed to provide a region of five film layers. Where bladder 152 is positioned within bladder 166, outer layers 154 and 156 are attached to outer layers 168 and 170 respectively so that the internal bladder 152 acts as the tensile member in that region of the bladder. Internal bladders 152 are also anchored into position by attachment of inflation conduits 164 at the peripheral seam of bladder 166. Bladder 152 is pressurized to a higher pressure than bladder 166 so that the portion of bladder 166 containing three layer bladders 152 exhibits a stiffer response to cushioning than the main body portion of the bladder which only has tensile member 172 which does not interfere with the cushioning effects of air. By adding non-communicating multiple layer chambers such as internal bladder 152, the cushioning characteristics of the bladder can be varied while still providing a complex-contoured shape without deep peaks and valleys. A complex-contoured tensile bladder into which three layer bladders 152 can be incorporated is disclosed in U.S. Pat. No. 5,802,739 to Potter et al., which is hereby incorporated by reference.

When four or more film layers are used in the construction, an alternative conceptual principle is that of a bladder comprising a group of fluid filled inner chambers and two outer film layers overlaying the inner chambers and attached to them at selected connection sites to provide an outer chamber or two. This construction results in a stable, planar bladder in which the outer film layers moderate the inner chambers, especially if the inner chambers are of higher pressure than the outer chamber. The higher pressure chambers formed of flat films may also tend to twist, and the addition of outer films and a lower pressure outer chamber would prevent twisting by balancing the static loads of the bladder when filled with fluid.

Figure 33:
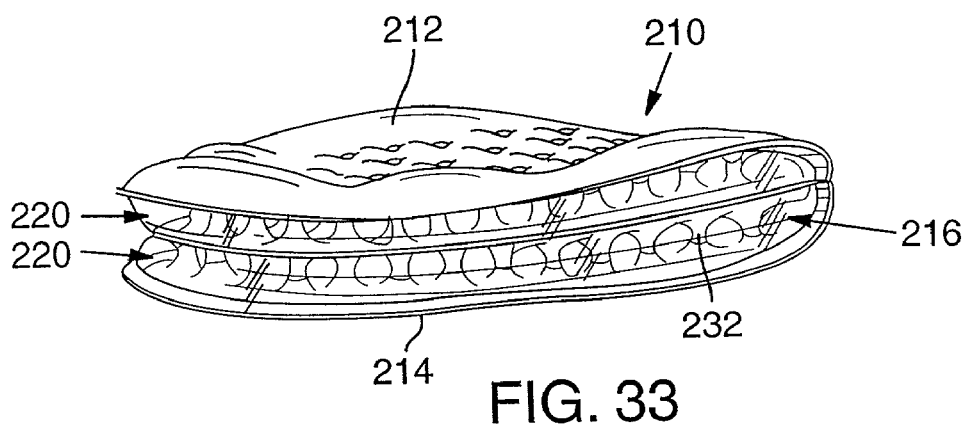
FIG. 33 is a perspective view of the bladder of FIG. 32.

The multiple film layer bladders of the present invention may also be constructed with an inverted seam along the sidewall. As shown in FIGS. 32-35, an inverted seam may be formed of the inner barrier sheets. Bladder 210 includes top, outer barrier layer 212 formed of a sheet of barrier material and a bottom, outer barrier layer 214 formed of a sheet of barrier material. Barrier layers or sheets 212 and 214 are referred to as "top barrier sheet" and "bottom barrier sheet," respectively, for ease of explanation. The use of the reference terms "top," "bottom," etc. are not intended to be limiting on the present invention, but rather are for ease of description and refer to the orientation of the bladders as shown in the figures. Layers 212 and 214 can be secured directly to each other along edge 211, as shown at the right side of FIG. 32 and in the prior embodiments, or operatively secured to each other by sidewall(s) 216, as shown in FIG. 33. Edge 211 is positioned within an article of footwear so that it is surrounded by midsole or outsole materials when the footwear is constructed, see FIG. 24.

Bladder 210 is constructed so that sidewalls 216 are the same size or larger than the windows exposing them, i.e., openings in the side of the midsole. The number and size of the sidewalls 216 can depend on how many windows are in the midsole of the footwear, how much of bladder 210 is intended to be exposed through each bladder window and the size of each window. A sidewall can be individually formed for each window or one wall can be formed for extending within and between all of the windows. For example, a bladder in the heel may be exposed by one or more windows on each side of the footwear and include the same number of sidewalls as windows. In the alternative, the midsole can be formed with a single window that wraps around the heel.

Figure 34:
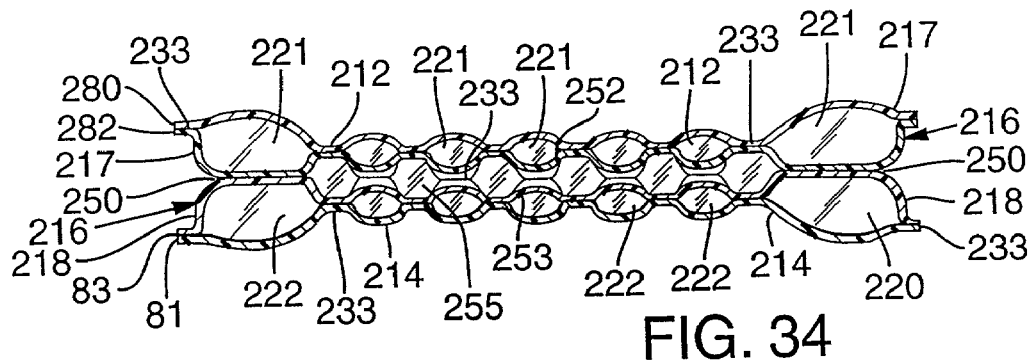
FIG. 34 is a cross-sectional view of the bladder of FIG. 32, taken along the line 34-34 of FIG. 32.
Figure 35:
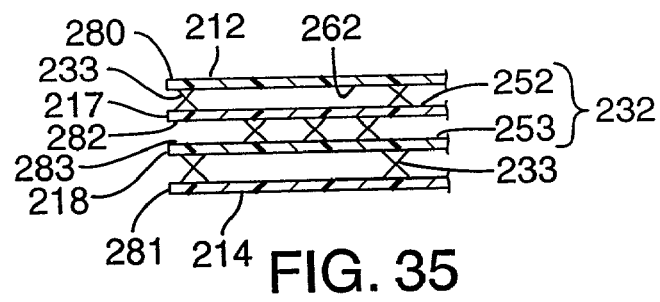
FIG. 35 is a partial cross section of the bladder of FIG. 32, before welding and inflation with schematic representations of weld sites.
Figure 36:
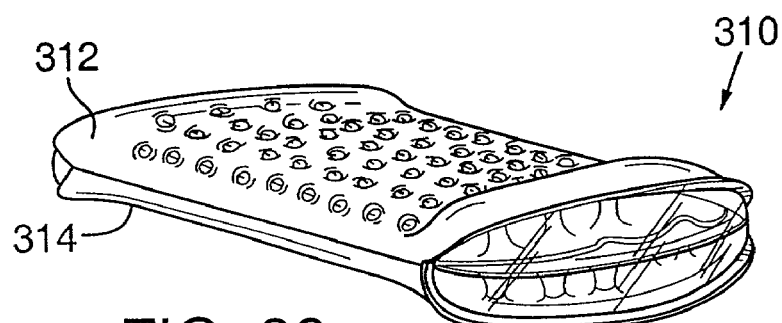
FIG. 36 is a perspective view of a multiple film layer bladder having a centered inverted, sidewall seam formed from separate sidewall elements in accordance with yet another embodiment of the present invention.
Figure 37:
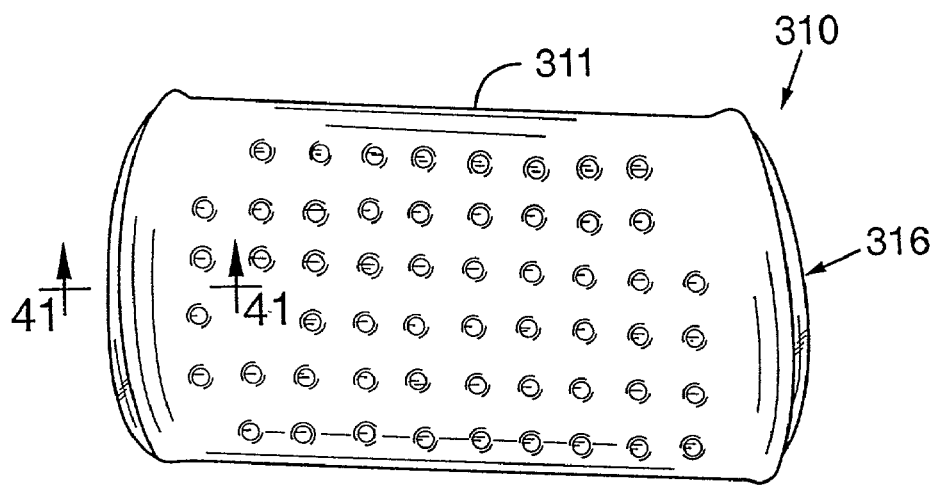
FIG. 37 is a top plan view of the bladder of FIG. 36.

As best seen in FIG. 34, each sidewall 216 is formed by attaching the edges of the two inner barrier layers to the top and bottom outer layers adjacent a weld of the two inner barrier layers. Each sidewall 216 has an upper sidewall portion 217 and a lower sidewall portion 218 connected at an inwardly directed or inverted seam 250 formed by securing the two inner layers together by using securing techniques such as radio frequency (RF) welding, discussed below. Sidewall portions 217, 218 in this bladder are the terminal ends of a tensile member 232. A tensile member is an internal element within a bladder that insures a fixed, resting relation between the top and bottom barrier layers when the bladder is fully inflated. Tensile members often act as restraining members for maintaining the general form of the bladder. An example of tensile members includes at least one inner sheet of a barrier material secured at certain locations along the bladder to form an internal framework that maintains the shape of the bladder as described in the '001 patent to Potter et al. In another tensile member embodiment, the bladder chamber could include three dimensional fabric extending between the top and bottom sheets of barrier material such as those disclosed in U.S. Pat. Nos. 4,906,502 and 5,083,361 to Rudy, which are hereby incorporated by reference.

Bladder 210 includes tensile member 232 formed of two inner barrier layers 252, 253 formed of sheets of barrier material. Layers 252 and 253 are sealed together and extend between the inner surfaces 262 of top and bottom barrier layers 212 and 214 for maintaining the shape and contour of bladder 210. Inner layers 252, 253 are secured to outer layers 212 and 214 using conventional techniques such as RF welding. The resulting welds 233 formed between any of the layers at the points of attachment are indicated schematically in FIG. 35 by "X." Barrier layers 252 and 253 are secured together to establish an inner bladder chamber 255 providing multi-stage or multi-layer cushioning within bladder 210. Chamber 255 can include a plurality of internal channels.

Outer barrier layers 212 and 214 are welded together along their peripheral edges 280, 281 to the peripheral edges 282, 283, respectively of inner barrier layers 252 and 253. This peripheral welding, as well as the interior welds 233 between the inner and outer layers results in a plurality of upper bladder chambers 221 above layer 252 and chambers 255, and a plurality of lower bladder chambers 222, below layer 253 and chambers 255. When the peripheral edge 282 of layer 252 is secured to the entire peripheral edge 281 of outer layer 212 and the peripheral edge 283 of layer 253 is secured to the entire peripheral edge 281 of outer layer 214, chambers 221 will be isolated from chambers 222 so that they are not in fluid communication. The three chambers 221, 255, and 222 allow for at least three different fluid pressures to be achieved within bladder 210. The fluid pressure within chambers 255 is preferably greater than that in chambers 220 and 222 so that bladder 210 will not bottom out under an applied load. Specifically, the pressure in chamber 255 is substantially in the range of 20 to 50 psi.

Figure 38:
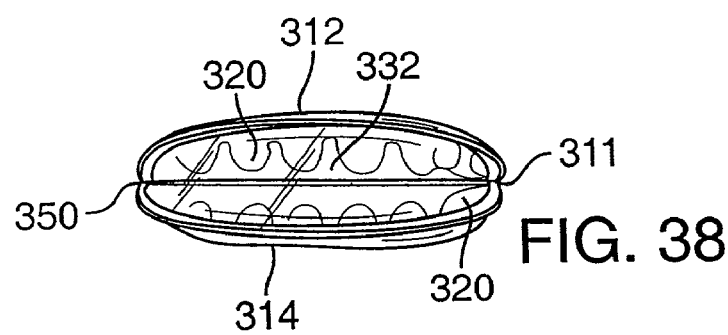
FIG. 38 is a side elevational view of one side of the bladder of FIG. 36.
Figure 39:
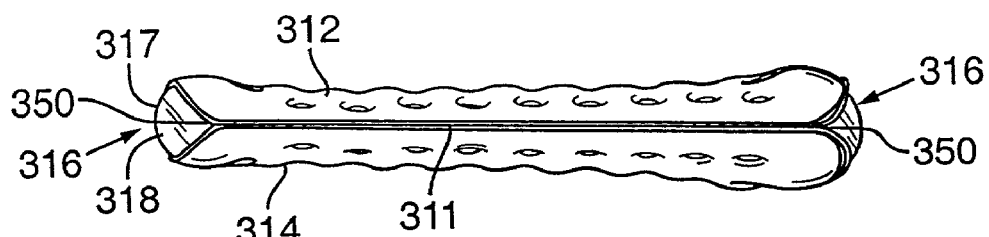
FIG. 39 is a side elevational view of a side of the bladder of FIG. 36 that extends essentially perpendicular to the side shown in FIG. 38.
Figure 40:
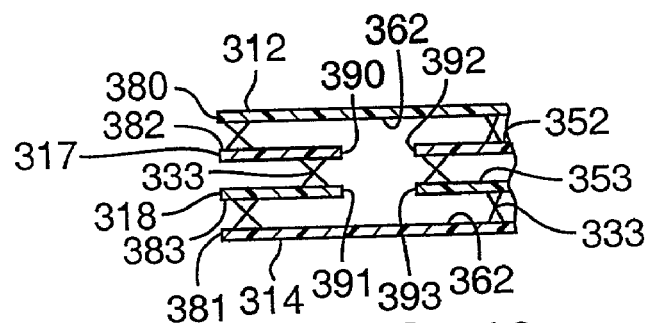
FIG. 40 is a partial cross section of the bladder of FIG. 36 before welding and inflation with schematic representations of weld sites.
Figure 41:
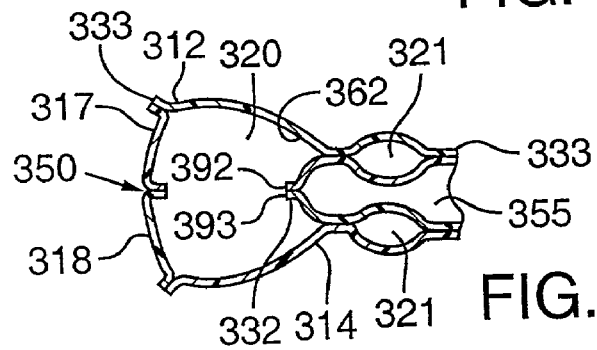
FIG. 41 is a partial cross section of the bladder of FIG. 36 taken along the line 41-41 in FIG. 37.
Figure 42:
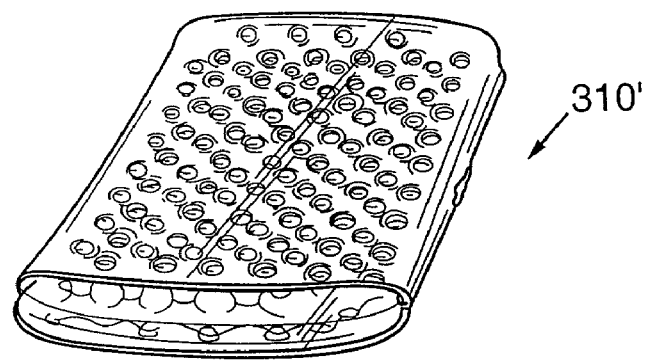
FIG. 42 is a perspective view of a multiple film layer bladder having a centered inverted, sidewall seam formed from separate sidewall elements in accordance with another embodiment of the present invention.
Figure 43:
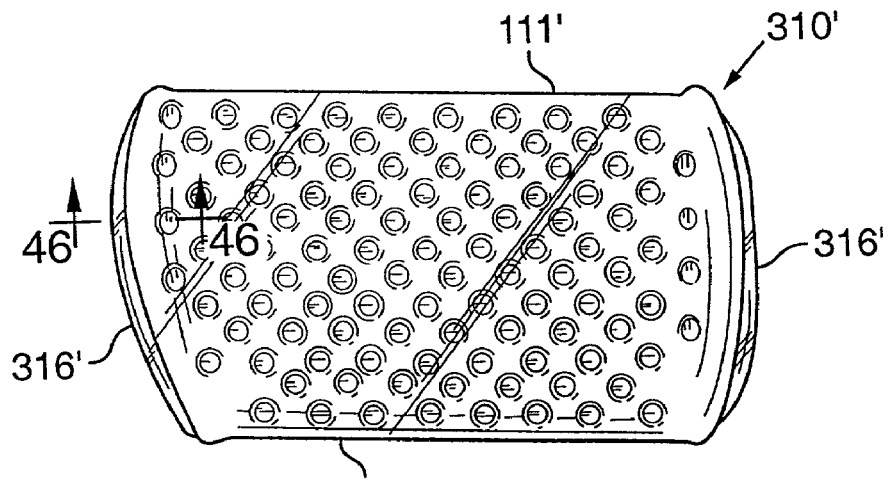
FIG. 43 is a top plan view of the bladder of FIG. 42.
Figure 44:
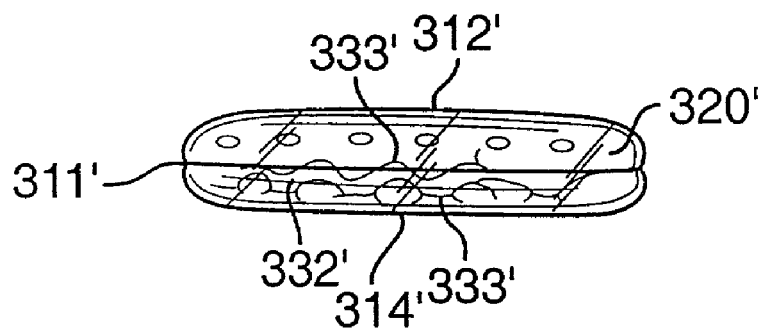
FIG. 44 is a side elevational view of one side of the bladder of FIG. 42.
Figure 45:
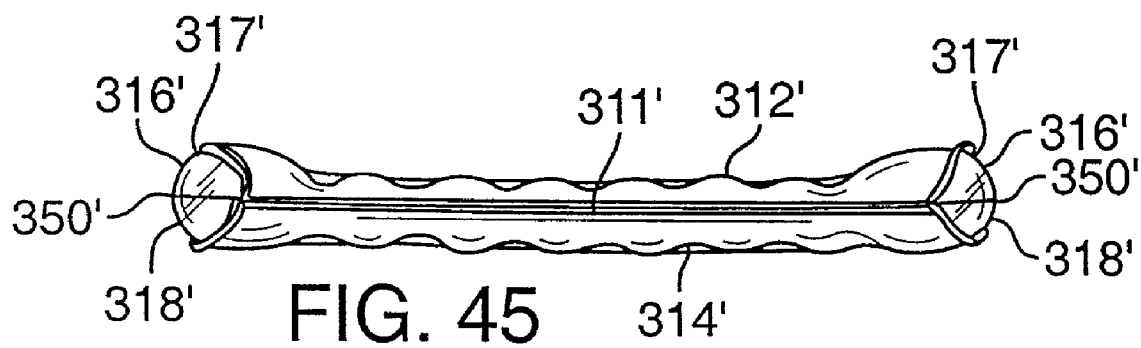
FIG. 45 is a side elevational view of a side of the bladder of FIG. 42 that extends essentially perpendicular to the side shown in FIG. 44.

FIGS. 36-47 illustrate inverted seam bladders having a centered inverted seam which is formed of separate sidewall elements. A first such embodiment, bladder 310', is shown in FIGS. 36-41; and a second embodiment, bladder 310, is shown in FIGS. 42-47. Bladders 310, 310' are designed for positioning in the forefoot of an article of footwear so their sidewalls 316, 316' are exposed through a forefoot window or pair of forefoot windows along the lateral or medial side of an article of footwear. Bladder 310 includes top, outer barrier layer 312 formed of a sheet of barrier material and bottom, outer barrier layer 314 also formed of a sheet of barrier material. Layers 312 and 314 can be secured directly to each other along their unexposed sides 311, as shown in FIG. 39. The sides 311 of bladder 310 that are not intended to be exposed by a bladder window extend across the width of the footwear and are covered by material forming the midsole or outsole. Layers 312 and 314 are operatively secured to each other along their exposed sides by sidewall (s) 316, as shown in FIGS. 38-40. Welds 333 are schematically indicated by "X" representing the points of attachment between the layers of bladder 310 in FIG. 40.

Bladder 310 is constructed so that sidewalls 316 are the same size or larger than the windows exposing them. The number and size of the sidewalls 316 can depend on how many windows are in the midsole of the footwear, how much of bladder 310 is exposed through each bladder window and the size of each window. Each sidewall 316 is formed of an upper sidewall piece 317 and a lower sidewall piece 318 connected at an inverted seam 350 using well known securing techniques such as welding. Seam 350 is inwardly directed toward the center of the bladder and is centered along the sidewall. Sidewall pieces 317, 318 in this bladder are formed of individual pieces of barrier materials separate from tensile member 332, and peripheral edges 380 and 381 of layers 312 and 314 are secured to edges 382, 383 of sidewall pieces 317 and 318.

A tensile member 332 is formed of two inner barrier layers 352, 353. Each layer 352, 353 is formed of a sheet of barrier material. Layers 352, 353 are sealed together and extend between the inner surfaces 362 of top and bottom barrier sheets 312, 314 for maintaining the shape and contour of bladder 310. Sealed layers 352, 353 provide a plurality of chambers 355 for containing a fluid that provides a second level of cushioning within bladder 310. The fluid pressure within region 355 can be greater than that in chambers 321 and 322 so that bladder 310 will not bottom out during use. As shown in FIG. 40 sidewall pieces 317 and 318 are not integral with layers 352 and 353 and a gap exists between the inner edges 390, 391 of sidewalls pieces 317 and 318 and the peripheral edges 392, 393 of inner barrier layers 352 and 353 so that bladder chambers 321 and 322 are not divided into two separate bladder chambers as in FIGS. 32-35. Rather, bladder chambers 321 and 322 are in fluid communication with one another via a peripheral bladder chamber 320.

Figure 46:
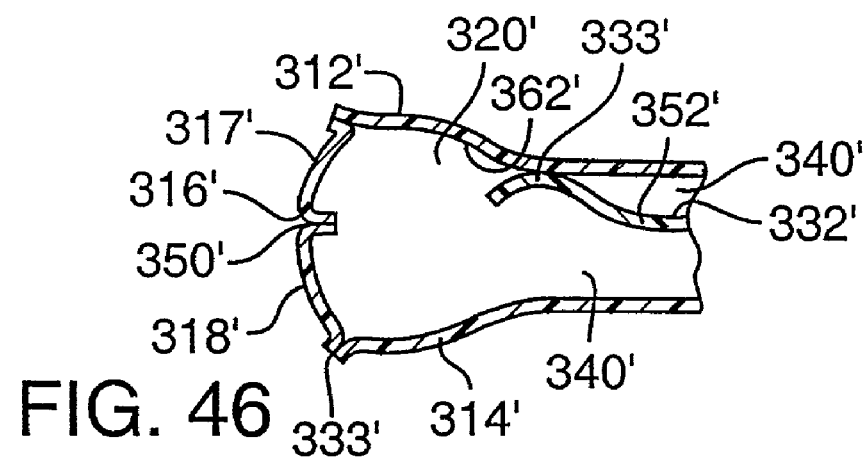
FIG. 46 is a partial cross section of the bladder of FIG. 42 taken along the line 46-46 in FIG. 43.
Figure 47:
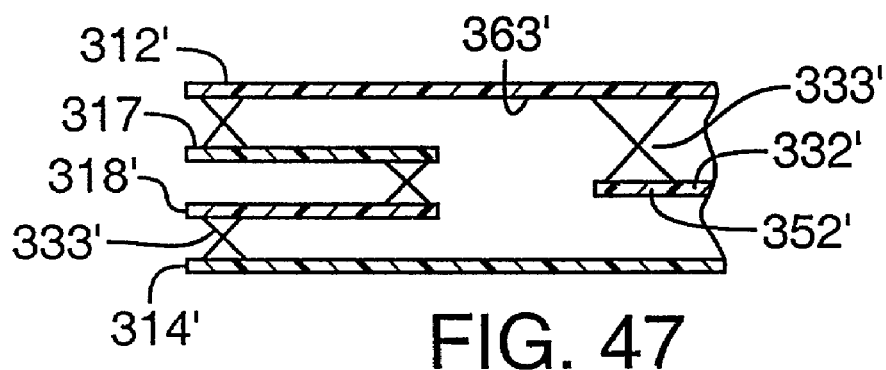
FIG. 47 is a partial cross section of the bladder of FIG. 42 before welding and inflation with schematic representations of weld sites.

Bladder 310', shown in FIGS. 42-47, is similar to bladder 310 in that it includes top and bottom barrier layers 312', 314' formed of sheets of at least one barrier material and connected along edge 311'. It also includes sidewalls 316' formed of sidewall pieces 317', 318' positioned between layers 312' and 314'. As shown in FIGS. 46 and 47, sidewall pieces 317' and 318' are secured to layers 312', 314' and each other so they form an inverted seam 350'. Bladder 310' only differs from bladder 310 in its internal tensile member 332'. Unlike tensile member 332, tensile member 332' does not form an internal region with multiple chambers. Instead, tensile member 332' includes at least one internal layer 352', formed of a sheet of a barrier material, secured to the inner surfaces 362' of top and bottom layers 312', 314' using well known techniques such as welding. The welds 333' are shown by an "X" in FIG. 47 to indicate schematically the locations of the welds. Tensile member 332' forms communicating channels 340' within chamber 320'.

Figure 48:
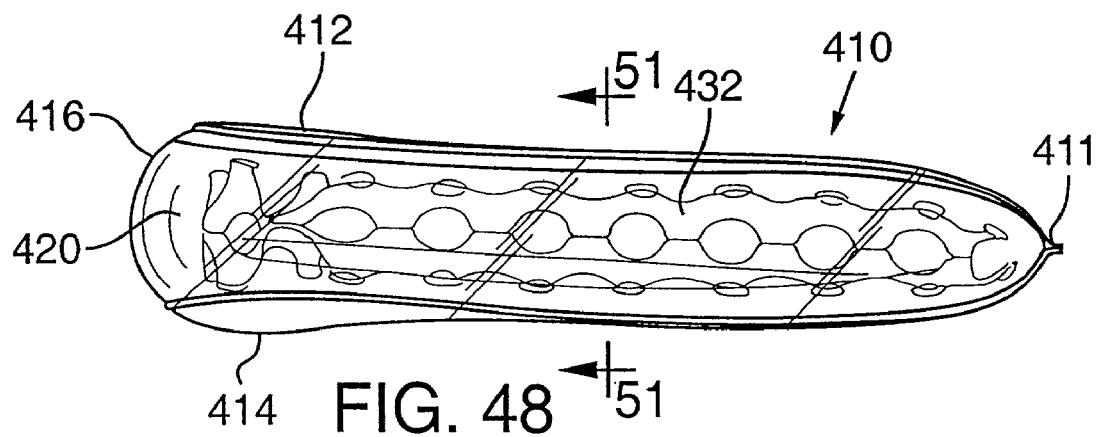
FIG. 48 is a side elevational view of a multiple film layer bladder having a displaced inverted, sidewall seam formed from separate sidewall elements in accordance with another embodiment of the present invention.
Figure 49:
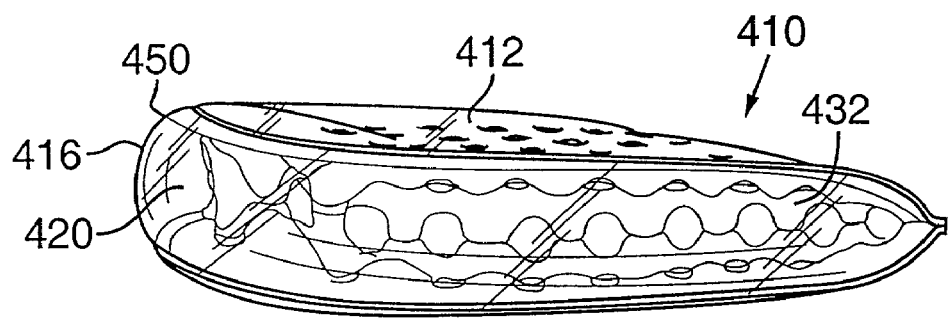
FIG. 49 is a perspective view of the bladder of FIG. 48.

FIGS. 48-51 illustrate another embodiment of the present invention in a bladder having an inverted seam which is offset or displaced from the center of the sidewall. In FIG. 48 bladder 410 includes outer barrier layers 412, 414 formed of sheets of barrier material. Layers 412 and 414 are secured directly to each other along edge 411 and operatively secured to each other by sidewall(s) 416. Each sidewall 416 is formed of an upper sidewall piece 417 and a lower sidewall piece 418 secured together at an inwardly directed seam 450 which is offset or displaced from a central position on the sidewall.

Bladder 410 also includes a tensile member 432 having two inner barrier layers 452, 453 sealed together and extending between the inner surfaces 462 of top and bottom barrier sheets 412, 414 for maintaining the shape and contour of bladder 410. Layers 452 and 453 can be secured to inner surfaces 462 at a plurality of weld sites by RF welding. Layers 452, 453 are sealed about their perimeter and at a plurality of weld sites by welds 433, marked by an "X" in FIG. 51 and schematically representing weld sites to form an internal cushioning chamber 456 for containing a fluid that provides another level of cushioning within bladder 410.

Figure 50:
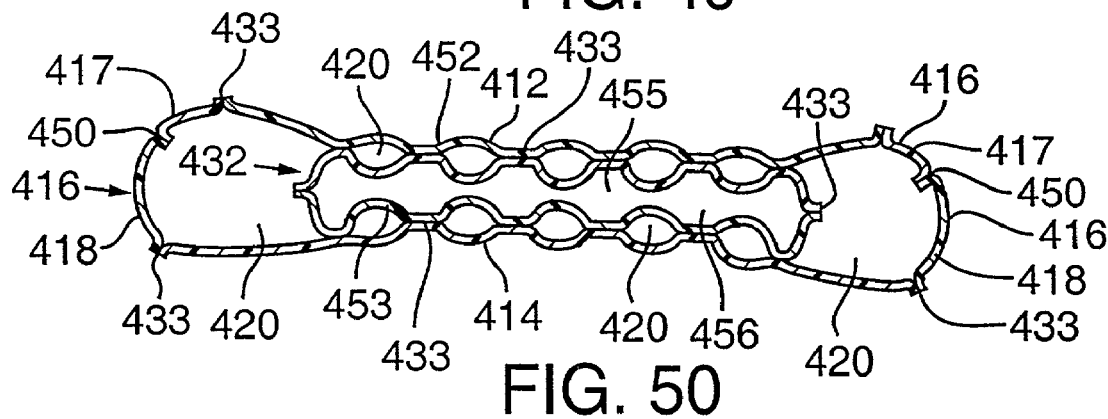
FIG. 50 is a cross-sectional view of the bladder of FIG. 48 taken along the line 50-50 in FIG. 48.
Figure 51:
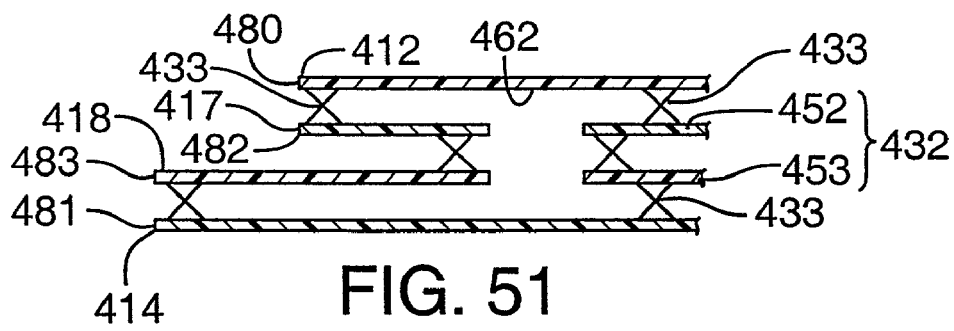
FIG. 51 is a partial cross section of the bladder of FIG. 48 before welding and inflation with schematic representations of weld sites.
Figure 52:
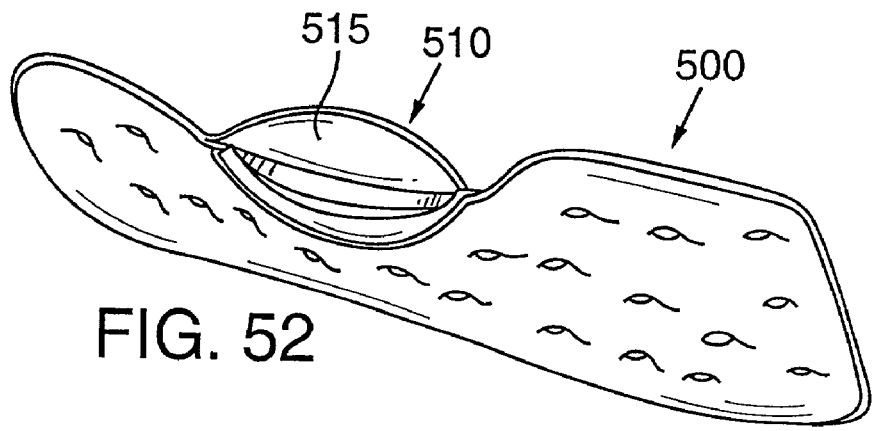
FIG. 52 is a perspective view of a multiple film layer bladder having an inverted seam in the arch region in accordance with another embodiment of the present invention.
Figure 53:
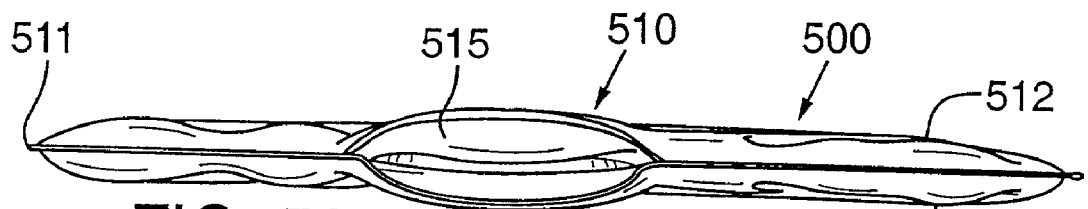
FIG. 53 is a side elevational view of the arch side of the bladder of FIG. 52.
Figure 54:
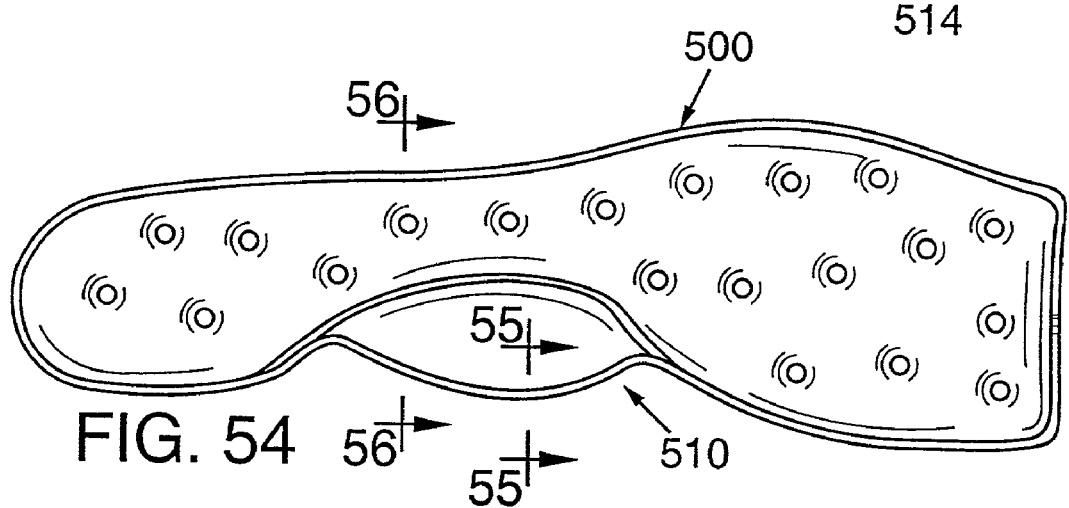
FIG. 54 is a top plan view of the bladder of FIG. 52.
Figure 55:
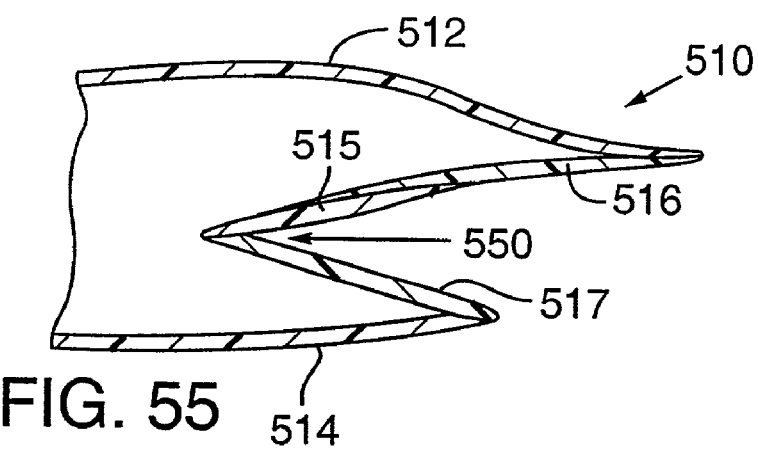
FIG. 55 is a partial cross section taken along line 55-55 in FIG. 54.
Figure 56:
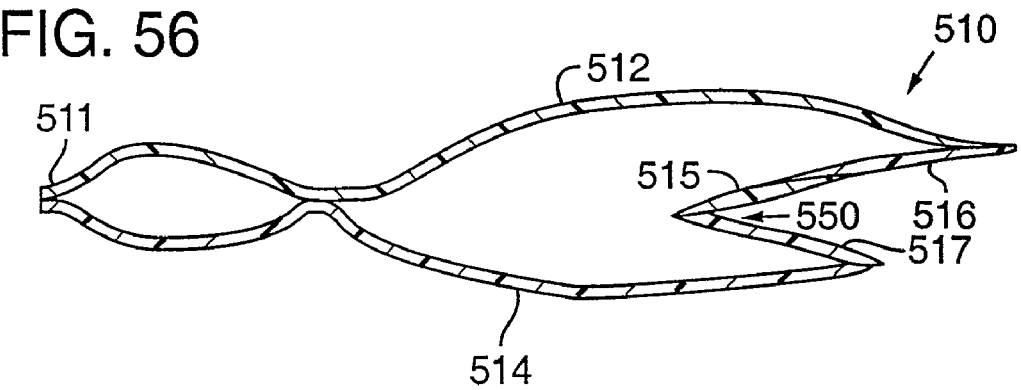
FIG. 56 is a cross section taken along line 56-56 of FIG. 54.

The outer walls of bladder 410 are formed by securing the peripheral edges 480 and 481 of upper and lower layers 412 and 414, respectively, to the edges 482 and 483 of sidewalls 417, 418, respectively and securing sidewalls 417 and 418 to each other along their other edge at inverted displaced seam 450. Chamber 420 is formed between the outer walls defined by layers 412, 414, and sidewalls 417, 418, and an interior chamber 455 formed by layers 452, 453. Chamber 420 contains a fluid for initially cushioning the shock generated during a foot strike. As shown in FIGS. 50-51, sidewall pieces 417 and 418 are not integral with layers 452 and 453 so bladder chamber 420 is not divided into two parts like chamber 20 in FIGS. 32-35. Chamber 455 includes a fluid to provide additional cushioning to dampen the shock generated during a foot strike. The fluid pressure within chamber 455 is greater than that in chamber 420 as discussed above with respect to bladder 210.

Inverted seam 450 of bladder 410 is displaced from the center of sidewall 416. The location of seam 450 is determined by the relative size of sidewall pieces 417 and 418. As shown in FIGS. 50-51, sidewall piece 418 is larger than piece 417. More specifically, piece 418 is approximately twice the width of piece 417. The size difference in combination with the location of the welds indicated with an "X," shown in FIG. 51, causes seam 450 to be displaced from the center of the sidewall when the bladder is inflated. The seam is located along sidewall 416 a distance equal to the span of piece 418 between its points of attachment to layer 414 and piece 417. Displaced seam 450 produces a sidewall 416 having its seam positioned at or above the upper limit of a bladder window through which it is exposed. Conversely, piece 417 can be larger than piece 418 so that seam 450 occurs at the bottom of the window instead of the top. The inverted orientation of seam 450 and its displacement to an edge hide it completely from a bladder window to give a clean, seamless appearance. This attachment method eliminates costly manufacturing steps taken to improve the appearance of the exposed bladder window and eliminate the thick rough edge.

This is especially true if seam 450 is offset from the center of the bladder a distance greater than half the height of the bladder window so the seam is completely offset from the window and only sidewall piece 418 is exposed. Such an offset allows larger sidewall part 418 to be formed of the transparent material while sidewall part 417 is formed of an opaque material. Moreover, moving the seam 450 in this manner can also increase the life of the bladder by moving the seam away from the areas of predicted high stresses. Although the displaced seam 450 is only discussed with respect to bladder 410, it could also be used with the other bladders according to the present invention.

FIGS. 52-56 illustrate a full length bladder 500 having a raised arch region 510 for providing support to the arch of a user in place of pads positioned below the insole of an article of footwear. Top and bottom barrier layers 512, 514 of bladder 500 can be secured directly together as at seam 511. Alternatively, they can be secured using an inverted seam. In this embodiment, the inverted seam is placed in the arch region 510, top layer 512 is secured to one end of first sidewall piece 516 of barrier material. A first end of second sidewall piece 517 is secured to bottom layer 514. The other end of sidewall piece 517 is secured to a first end of an intermediate piece 515 so an inverted seam 550 is formed between the two sidewall pieces 515, 517. The other end of intermediate piece 515 is secured to first sidewall piece 516 so that top and bottom layers 512, 514 are operatively connected.

Inverted seam 550 minimizes the distance the sidewall pieces 516, 517 extend away from the peripheral edge of bottom layer 514. The less the sidewalls extend away from the center of the bladder 500, the more the arch region can be built up and away from the center of the bladder without extending beyond the limits of the footwear into which it is incorporated.

Regarding the materials for the bladders disclosed herein, the top and bottom barrier sheets, sidewalls elements and inner barrier layers can be formed from the same or different barrier materials, such as thermoplastic elastomer films, using known methods. Thermoplastic elastomer films that can be used with the present invention include polyester polyurethane, polyether polyurethane, such as a cast or extruded ester based polyurethane film having a shore "A" hardness of 80-95, e.g., Tetra Plastics TPW-250. Other suitable materials can be used such as those disclosed in U.S. Pat. No. 4,183,156 to Rudy, hereby incorporated by reference. Among the numerous thermoplastic urethanes which are particularly useful in forming the film layers are urethanes such as Pellethane™, (a trademarked product of the Dow Chemical Company of Midland, Mich.), Elastollan® (a registered trademark of the BASF Corporation) and ESTANE® (a registered trademark of the B.F. Goodrich Co.), all of which are either ester or ether based and have proven to be particularly useful. Thermoplastic urethanes based on polyesters, polyethers, polycaprolactone and polycarbonate macrogels can also be employed. Further suitable materials could include thermoplastic films containing crystalline material, such as disclosed in U.S. Pat. Nos. 4,936,029 and 5,042,176 to Rudy, which are incorporated by reference; polyurethane including a polyester polyol, such as disclosed in U.S. Pat. No. 6,013,340 to Bonk et al., which is incorporated by reference; or multi-layer film formed of at least one elastomeric thermoplastic material layer and a barrier material layer formed of a copolymer of ethylene and vinyl alcohol, such as disclosed in U.S. Pat. No. 5,952,065 to Mitchell et al., which is incorporated by reference.

In accordance with the present invention, the multiple film layer bladder can be formed with barrier materials that meet the specific needs or specifications of each of its parts. The present invention allows for top layer to be formed of a first barrier material, bottom layer to be formed of a second barrier material and each part of the sidewall(s) to be formed of a third barrier material. Also, the sidewall parts can each be formed of different barrier materials. As discussed above, the inner barrier sheets and the sidewall parts are formed of the same barrier material when the inverted seam is formed by attaching the terminal ends of inner barrier sheets to the outer barrier sheets adjacent a weld of the inner sheets. As a result, when the inner barrier sheets are formed of a different material than outer barrier sheets, the sidewalls are formed of the same material as the inner barrier sheet material. Also, when the inner barrier sheets are formed of different materials, sidewall parts must be are formed of different materials as well for compatibility.

If the inner layers are to be visible through a bladder window, the sidewall will most likely be formed of a transparent material for maximum visibility. In the inverted seam embodiments shown in the figures, the top and bottom layers do not need to be formed of a transparent material. Instead, they can each be formed of an opaque barrier material having the same or different thicknesses. Similarly, the sidewall pieces can be formed of a thicker or thinner transparent material so the interior is visible. The thickness of sidewall 16 depends on at least the material used, the environment surrounding the bladder and the structural requirements of the sidewalls. Film thicknesses for the top and bottom layers are generally in the range of five (5) to one hundred (100) thousandths of an inch (0.005 to 0.100 inches). If a thicker sidewall is desired, its thickness is generally in the range of twenty-five (25) to two hundred (200) thousandths of an inch (0.025 to 0.200 inches).

According to the present invention, the barrier materials used for each portion of the bladder can be customized to meet only the specific needs of that portion. For example, if the top and bottom layers use an opaque, relatively thin, flexible barrier material, the exposed sidewalls can be made of a thicker, stiffer, transparent barrier material. Contrary to industry practice, only the portion of the bladder being shown in a bladder window would then be made from the stiffer transparent material. Also, the sidewalls can be made with a pre-shaped form or with greater rigidity to vertical compression in order to compliment the pressure in the bladder or individual pressure regions within the bladder. The materials chosen for sidewalls could also be used to stiffen portions of the footwear that experience compressive and sheer loading, such as the medial side of the heel. An economic benefit is also realized. By not forming the top and bottom layers with the same material as the sidewalls, the cost of producing a bladder can be reduced. According to the present invention, the most expensive materials are only used where needed, not over the entire bladder.

The bladder is inflated preferably with a gaseous fluid, for example, hexafluorethane, sulfur hexafluoroide, nitrogen, air, or other gases such as those disclosed in the aforementioned '156, '945, '029, or '176 patents to Rudy, or the '065 patent to Mitchell et al.

The method of forming a bladder with at least one inverted sidewall seam according to the present invention includes selecting the material for each portion based on at least the forces and stresses it will experience and the performance characteristics it is intended to provide. The aesthetics of each portion of the bladder must also be considered. For example, if the interior of the bladder is intended to be visible, the exposed sidewall(s) need to be formed of a transparent material that allows the desired visibility. However, as discussed above, the transparent material must also be strong enough to prevent rupturing from externally applied forces and to withstand bending stresses applied to bladder sidewalls during the stride of the user. While the sidewalls are transparent and include a thickness of 0.020 to 0.100 inches, the top and bottom layers of the bladder may be formed of an opaque material having a thickness of 0.005 to 0.050 inches to meet the specific needs of their final location in the shoe, as discussed above. If a bladder configuration is desired that provides visibility from only the bottom surface, the top and bottom films can be different. A clear film with a thickness in the range of 0.020"-0.100" could be used on the bottom surface and a standard opaque film of 0.005"-0.010" could be used for the top and side surfaces.

After the size and types of materials have been determined, the barrier sheets forming the top layer, bottom layer and sidewalls are shaped using well known cutting or forming techniques. The flat, shaped sheets are then positioned so their peripheral edges form the perimeter of the bladder. The sidewall pieces are positioned between the top and bottom barrier sheets and secured thereto using well known techniques such as RF welding. The barrier sheets used to form the bladders are selectively treated with a weld prevention material which prevents RF welds from being formed. Examples of weld inhibitors are Teflon® coatings and Teflon® coated fabrics or strips, such as Du Pont Teflon® #49 or #57, which can positioned wherever welds are to be inhibited. Other conventional weld inhibitors or blockers, such as tapes manufactured by 3M, including Scotch "Magic Mending" tape and Highland 3710 Box Sealing tape, or tape manufactured by Faron, including Kapton PSA tape or Teflon® PSA tape, Fluoroglide "FB" spray lubricant by Norton, or water-based coatings by Graphic Sciences with either Teflon® or parafin, a styrenic acrylic polymer, can be used between the layers and sidewalls to insure that only the intended portions of the bladder are secured together. The inhibitors are either removed after welding or are consumed in the RF welding process.

To make any of the bladders described herein, the weld pattern for each layer is first determined and marked on the sheets. The weld pattern would correspond to the pattern of connection sites on the specific side of a layer. This pattern is marked on the sheets either in the positive or negative by screen printing, inkjet printing, or a transfer method. The marking can be visible as with an ink, or invisible as with a transfer method which applies weld inhibiting material onto the side of the film layer. It will be understood that the weld prevention materials would generally be the negative image of the desired connection sites. The application of weld inhibiting material onto the layer can be a separate method step from the marking of the connection sites. The variety of connection site shapes and configurations is limited only by the application of weld inhibiting material to the layers.

Once the connection sites are properly marked and the weld inhibiting material applied to the film layers, RF energy is applied and RF welding takes place only where layers are in direct contact with one another and not separated by weld prevention material. The peripheral seal of the outermost layers to form the envelope of the bladder can be formed in an integral step with the remainder of the welds, or could be formed before or after the welding of the connection sites. After the bladder is formed, it is filled with fluid, and the inlet port is sealed off by a RF weld.

While RF welding has been the preferred method of making the multi-stage cushioning bladders of the present invention, the particular type of attachment may vary. For instance, an adhesive bond between film layers may be used, as well as other known fusion, thermal, and ultrasonic bonding methods.

After the bladder has been assembled and the chambers formed, the bladder chambers can be inflated using well known techniques. While the preferred method is to use flat sheets of material, the sidewalls, and outer and inner barrier layers, can also be preformed to have different shapes and effects before they are secured together to form the bladder. For example, shapes can be formed by thermoforming the sheets of the barrier layer materials.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the claims appended hereto.

That which is claimed is:

1. A fluid-filled bladder for an article of footwear, said bladder comprising:
   a first sheet;
   a second sheet that is at least partially coextensive with said first sheet;
   a first sidewall element defining a first end and a first exterior surtice, said first end being secured to said first sheet to position at least a portion of said first exterior surface on an exterior of said bladder, and said first sidewall element extending through a first portion of a distance between said first sheet and said second sheet;
   a second sidewall element defining a second end and a second exterior surface, said second end being secured to said second sheet to position at least a portion of said second exterior surface on said exterior of said bladder, and said second sidewall extending through a second portion of said distance between said first sheet and said second sheet; and
   an inverted seam firmed between said first exterior surface and said second exterior surface to join said first sidewall element and said second sidewall element and define a sealed chamber for containing said fluid.

2. The bladder of claim 1, wherein a distance between said inverted seam and said first sheet is greater than a distance between said inverted seam and said second sheet.

3. The bladder of claim 1, wherein said fluid is a gas at a pressure above an ambient pressure.

4. The bladder of claim 1, wherein said first sheet, said second sheet, said first sidewall element, and said second sidewall element are formed from a barrier material.

5. The bladder of claim 1, wherein at least two of said first sheet, said second sheet, said first sidewall element, and said second sidewall element are formed from different barrier materials.

6. The bladder of claim 1, further including a tensile member positioned between said first and second sheets fur maintaining a shape of said bladder.

7. The bladder of claim 6, wherein said tensile member is secured to inner surfaces of said first sheet and said second sheet.

8. The bladder of claim 7, wherein said tensile member is at least two sheets of barrier material secured together to form an internal fluid-filled bladder.

9. The bladder of claim 6, wherein said tensile member is formed from a barrier material.

10. The bladder of claim 6, wherein said first sidewall element and said second sidewall element form said tensile member.

11. The bladder of claim 6, wherein said tensile member is a single element of sheet material.

12. A fluid-filled bladder for an article of footwear, said bladder comprising:
    a first sheet of a barrier material;
    a second sheet of a barrier material that is at least partially coextensive with said first sheet;
    a first sidewall element of a barrier material defining a first end and a first exterior surface, said first end being secured to said first sheet to position at least a portion of said first exterior surface on an exterior of said bladder, and said first sidewall element extending through a first portion of a distance between said first sheet and said second sheet;
    a second sidewall element of a barrier material defining a second end and a second exterior surface, said second end being secured to said second sheet to position at least a portion of said second exterior surface on said exterior of said bladder, and said second sidewall extending through a second portion of said distance between said first sheet and said second sheet;
    en inverted seam formed between said first exterior surface and said second exterior surface to join said first sidewall element and said second sidewall element and define a sealed chamber for containing said fluid; and
    a tensile member positioned between said first sheet and said second sheet for maintaining a shape of said bladder, said tensile member being secured to inner surfaces of said first sheet and said second sheet.

13. The bladder of claim 12, wherein said tensile member is at least two sheets of a material secured together to form an internal fluid-filled bladder.

14. The bladder of claim 12, wherein a distance between said inverted seam and said first sheet is greater than a distance between said inverted seam and said second sheet.

15. The bladder of claim 12, wherein said first sidewall element and said second sidewall element form said tensile member.

16. The bladder of claim 12, wherein said fluid is a gas at a pressure above an ambient pressure.

17. A fluid-filled bladder for an article of footwear, said bladder comprising:
    a first sheet of a barrier material;
    a second sheet of a barrier material that is at least partially coextensive with said first sheet;
    a first sidewall element of a barrier material defining a first end and a first exterior surface, said first end being secured to said first sheet to position at least a portion of said first exterior surface on an exterior of said bladder, and said first sidewall element extending through a first portion of a distance between said first sheet and said second sheet;
    a second sidewall element of a barrier material defining a second end and a second exterior surface, said second end being secured to said second sheet to position at least a portion of said second exterior surface on said exterior of said bladder, and said second sidewall extending through a second portion of said distance between said first sheet and said second sheet; and
    an inverted seam formed between said first exterior surface and said second exterior surface to join said first sidewall element and said second sidewall element and define a sealed chamber for containing said fluid, wherein said first sidewall element and said second sidewall element extend into an interior portion of said bladder to form a tensile member positioned between said first sheet and said second sheet, said tensile member being secured to inner surfaces of said first sheet and said second sheet to maintain a shape of said bladder.

18. The bladder of claim 17, wherein a distance between said inverted seam and said first sheet is greater than a distance between said inverted seam and said second sheet.

19. The bladder of claim 17, wherein said sidewall element and said second sidewall element are attached to each other in said interior portion of said bladder to form an internal bladder.

20. The bladder of claim 17, wherein said fluid is a gas at a pressure above an ambient pressure.

* * * * *